(12) United States Patent
Fuhrmann et al.

(10) Patent No.: US 11,175,127 B2
(45) Date of Patent: Nov. 16, 2021

(54) SYSTEM AND METHOD FOR LARGE SAMPLE ANALYSIS OF THIN FILM

(71) Applicant: ILLUMINA, INC., San Diego, CA (US)

(72) Inventors: Alexander Fuhrmann, San Diego, CA (US); Timothy J. Merkel, Escondido, CA (US); Cyril Delattre, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 16/616,843

(22) PCT Filed: Nov. 9, 2018

(86) PCT No.: PCT/US2018/060150
§ 371 (c)(1),
(2) Date: Nov. 25, 2019

(87) PCT Pub. No.: WO2019/094813
PCT Pub. Date: May 16, 2019

(65) Prior Publication Data
US 2020/0393239 A1 Dec. 17, 2020

Related U.S. Application Data

(60) Provisional application No. 62/585,247, filed on Nov. 13, 2017.

(51) Int. Cl.
*G01B 11/06* (2006.01)
*G01N 21/3563* (2014.01)
(Continued)

(52) U.S. Cl.
CPC ........ *G01B 11/0625* (2013.01); *G01B 21/085* (2013.01); *G01N 21/3563* (2013.01); *G01N 21/8422* (2013.01); *G01N 2021/8427* (2013.01)

(58) Field of Classification Search
CPC ..... G01B 11/02; G01B 11/06; G01B 11/0625; G01B 21/08; G01B 21/085;
(Continued)

(56) References Cited

U.S. PATENT DOCUMENTS 3,747,755 A 7/1973 Senturia et al.
5,764,874 A 6/1998 White
(Continued)

FOREIGN PATENT DOCUMENTS

DE 198 32 833 A1 2/2000
KR 20140025009 A 3/2014

*Primary Examiner* — Jonathan M Hansen
(74) *Attorney, Agent, or Firm* — Marshall, Gerstein & Borun LLP

(57) ABSTRACT

Examples of a method include maintaining a large area thin film at a predetermined angle with respect to a spatially non-scanning infrared (IR) radiation source. The large area thin film reflects infrared radiation and at least a portion of the large area thin film is electrically conductive. The predetermined angle is selected from an angle ranging from about 0° to about 45°. Examples of the method include, while maintaining the large area thin film at the predetermined angle, directly illuminating the large area thin film with infrared radiation from the spatially non-scanning infrared radiation source, and thermal imaging reflected infrared radiation from the large area thin film by an infrared imaging system having an optical axis positioned at a fixed angle with respect to the large area thin film. The fixed angle is selected from an angle ranging from about 0° to about 45°.

22 Claims, 12 Drawing Sheets
(4 of 12 Drawing Sheet(s) Filed in Color)

(51) Int. Cl.
*G01N 21/84* (2006.01)
*G01B 21/08* (2006.01)

(58) Field of Classification Search
CPC ........... G01N 21/3563; G01N 21/8422; G01N 2021/8427; G01N 21/35
See application file for complete search history.

(56) References Cited

U.S. PATENT DOCUMENTS

| | | |
|---|---|---|
| 6,086,453 A | 7/2000 | Fukuoka et al. |
| 6,822,734 B1 | 11/2004 | Eidelman et al. |
| 7,462,809 B2 | 12/2008 | DiMarzio et al. |
| 7,605,924 B2 | 10/2009 | Howard et al. |
| 2004/0207836 A1 | 10/2004 | Chhibber et al. |
| 2005/0263706 A1 | 12/2005 | Park et al. |
| 2006/0289766 A1 | 12/2006 | DiMarzio et al. |
| 2008/0317090 A1 | 12/2008 | Tralshawala et al. |
| 2009/0302204 A1 | 12/2009 | Saito |
| 2012/0050537 A1 | 3/2012 | Ringermacher et al. |
| 2013/0048873 A1 | 2/2013 | Young et al. |
| 2015/0339830 A1 | 11/2015 | Heissenstein et al. |
| 2016/0282271 A1 | 9/2016 | Ebbecke et al. |
| 2017/0336328 A1* | 11/2017 | Gupta ................. G01N 21/8806 |
| 2018/0372487 A1* | 12/2018 | Irie ........................ G01B 21/08 |

* cited by examiner

→ COATING DEFECTS    ⇢ SURFACE DEFECTS

IR PEDOT QC VARIANCE COMPONENTS

| VARIANCE COMPONENTS | | | | |
|---|---|---|---|---|
| COMPONENT | VAR COMPONENT | % OF TOTAL | 20  40  60  80 | SQRT(VAR COMP) |
| OPERATOR | 0.1651616 | 2.1 | | 0.4064 |
| TIME | 1.4167308 | 17.9 | | 1.1903 |
| COATING | 5.4108565 | 68.3 | | 2.3261 |
| ROI | 0.4902361 | 6.2 | | 0.7002 |
| SampleNumber | 0.0943512 | 1.2 | | 0.3072 |
| WITHIN | 0.3440824 | 4.3 | | 0.5866 |
| TOTAL | 7.9214185 | 100.0 | | 2.8145 |

(A)

- 140 — THE LARGE AREA THIN FILM IS DEPOSITED ON A SUBSTRATE THAT IS TRANSPARENT TO VISIBLE LIGHT; THE LARGE AREA THIN FILM IS ALSO TRANSPARENT TO VISIBLE LIGHT; AND THE LARGE AREA THIN FILM IS DISTINGUISHABLE FROM THE SUBSTRATE IN A THERMAL IMAGE GENERATED BY THE INFRARED IMAGING DEVICE

- 145 — THE LARGE AREA THIN FILM IS SELECTED FROM THE GROUP CONSISTING OF POLY(3,4-ETHYLENEDIOXYTHIOPHENE) POLYSTYRENE SULFONATE, POLYPYRROLE, POLYANILINE, AND COMBINATIONS THEREOF

FIG. 15B (B)

- 240 — THE LARGE AREA THIN FILM IS SELECTED FROM THE GROUP CONSISTING OF POLY(3,4-ETHYLENEDIOXYTHIOPHENE) POLYSTYRENE SULFONATE, POLYPYRROLE, POLYANILINE, AND COMBINATIONS THEREOF

- 250
  - 252 — REPOSITIONING THE SAMPLE AT AN OTHER PREDETERMINED POSITION WITH RESPECT TO THE SPATIALLY NON-SCANNING INFRARED RADIATION SOURCE;
  - 253 — GENERATING AN OTHER OPTICAL IMAGE FROM REFLECTED INFRARED RADIATION FROM THE LARGE AREA THIN FILM BY THE INFRARED IMAGING SYSTEM POSITIONED TO RECEIVE THE REFLECTED INFRARED RADIATION THROUGH THE APERTURE; AND
  - 254 — COMBINING THE OPTICAL IMAGE AND THE OTHER OPTICAL IMAGE TO FORM A COMBINED IMAGE

- 260 — THE COMBINING THE OPTICAL IMAGE AND THE OTHER OPTICAL IMAGE INCLUDES DIGITALLY STITCHING THE OPTICAL IMAGE AND THE OTHER OPTICAL IMAGE TOGETHER TO GENERATE A COMPLETE IMAGE OF THE LARGE AREA THIN FILM

- 270 — PERFORMING A BACKGROUND CORRECTION TO CORRECT A THERMAL IMAGE GENERATED BY THE INFRARED IMAGING SYSTEM, WHEREIN THE BACKGROUND CORRECTION CORRECTS THE THERMAL IMAGE FOR A ZONE OF REDUCED INTENSITY INFRARED RADIATION FROM THE SPATIALLY NON-SCANNING INFRARED RADIATION SOURCE DUE TO THE APERTURE IN THE SPATIALLY NON-SCANNING INFRARED RADIATION SOURCE

FIG. 16B

SYSTEM AND METHOD FOR LARGE SAMPLE ANALYSIS OF THIN FILM

CROSS-REFERENCE TO RELATED APPLICATIONS

This application is a 35 U.S.C. § 371 National Phase Application of International Patent Application No. PCT/US2018/060150, filed Nov. 9, 2018, which itself claims the benefit of and priority to U.S. Provisional Patent Application No. 62/585,247, filed Nov. 13, 2017, the content of each of which is incorporated by reference herein in its entirety and for all purposes.

BACKGROUND

Transparent films are an operative component of some electronic devices, including liquid crystal displays (LCDs), photovoltaics, organic light-emitting diodes (OLEDs), touchscreens and digital fluidic devices. The operative properties of some examples of the transparent films may be related to the quality, homogeneity, and/or thickness of the transparent films. In order to ensure the transparent films are operative within specified limits, automated inspection may be performed. It may be possible to inspect a component by trying the final product; however, inspection of the transparent film in the production process soon after application of the transparent film may identify production quality issues before additional production steps are performed on parts with transparent films that are not within specified limits. The transparency of these transparent films may, in some cases, make rapid assessment of the operative properties difficult to assess. The difficulty of assessment may be increased by transparent film samples with large areas, samples having thinner transparent films, and when the transparent films are deposited on substrates that are also transparent.

Color Drawings

The patent or application file contains at least one drawing executed in color. Copies of this patent or patent application publication with color drawings will be provided by the Office upon request and payment of the necessary fee.

SUMMARY

An example of a method disclosed herein includes maintaining a large area thin film at a predetermined angle with respect to a spatially non-scanning infrared (IR) radiation source. The large area thin film reflects infrared radiation and at least a portion of the large area thin film is electrically conductive. The predetermined angle is selected from an angle ranging from about 0° to about 45°. The example of the method includes, while maintaining the large area thin film at the predetermined angle, directly illuminating the large area thin film with infrared radiation from the spatially non-scanning infrared radiation source, and thermal imaging reflected infrared radiation from the large area thin film by an infrared imaging system having an optical axis positioned at a fixed angle with respect to the large area thin film. The fixed angle is selected from an angle ranging from about 0° to about 45°.

Another example of the method disclosed herein includes maintaining a sample having a large area thin film at a predetermined position having a predetermined angle of about 0° with respect to a spatially non-scanning infrared radiation source. The large area thin film reflects infrared radiation and at least a portion of the large area thin film is electrically conductive. An IR source width of the infrared radiation source is at least two times an object width of the large area thin film. The example of the method includes, while maintaining the sample at the predetermined angle, directly illuminating the large area thin film with infrared radiation from the spatially non-scanning infrared radiation source. The example of the method further includes, through an aperture in the spatially non-scanning infrared radiation source, generating an optical image from reflected infrared radiation from the large area thin film by an infrared imaging system positioned to receive the reflected infrared radiation through the aperture.

An example of an infrared imaging system disclosed herein includes a sample stage to hold a large area thin film. The large area thin film reflects infrared radiation and includes a portion that is electrically conductive. A spatially non-scanning infrared radiation source is positioned at an angle of about 0° with respect to the sample stage. The spatially non-scanning infrared radiation source has an aperture defined therethrough. The spatially non-scanning infrared radiation source also has an IR source width that is at least two times an object width of the large area thin film. An infrared imaging system is positioned to receive infrared radiation reflected from the large area thin film through the aperture.

BRIEF DESCRIPTION OF THE DRAWINGS

The patent or application file contains at least one drawing executed in color. Copies of this patent or patent application publication with color drawings will be provided by the Office upon request and payment of the necessary fee.

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 15B is a continuation of the flow diagram of FIG. 15A;

FIG. 16B is a continuation of the flow diagram of FIG. 16A.

INTRODUCTION

Figure 1:
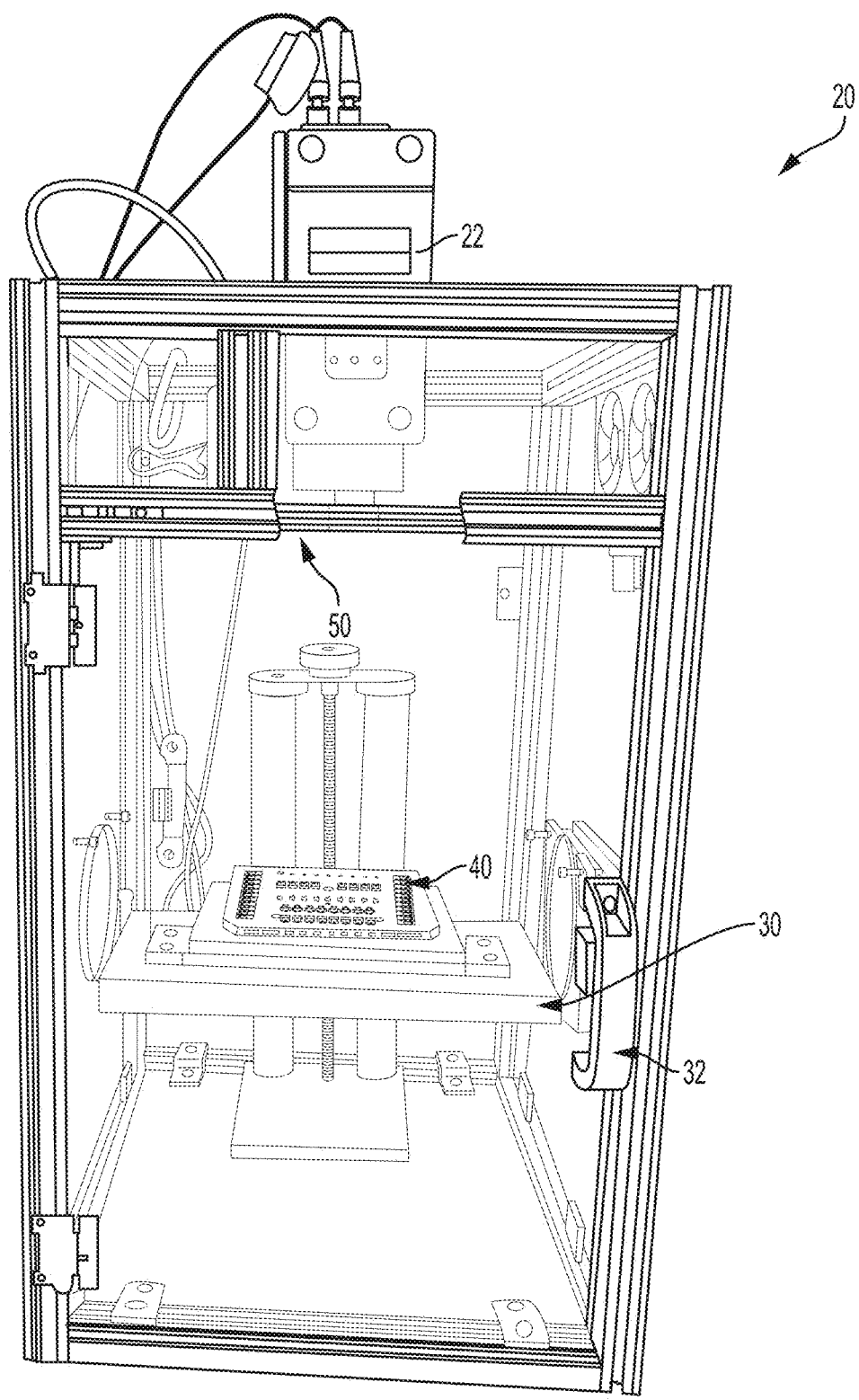
FIG. 1 is a front perspective view of an example of an infrared imaging system according to the present disclosure.

In a first aspect, a method comprises maintaining a large area thin film at a predetermined angle with respect to a spatially non-scanning infrared (IR) radiation source, wherein: the large area thin film reflects infrared radiation and at least a portion of the large area thin film is electrically conductive; and the predetermined angle is selected from an angle ranging from about 0° to about 45°; while maintaining the large area thin film at the predetermined angle, directly illuminating the large area thin film with infrared radiation from the spatially non-scanning infrared radiation source; and thermal imaging reflected infrared radiation from the large area thin film by an infrared imaging system having an optical axis positioned at a fixed angle with respect to the large area thin film, wherein the fixed angle is selected from an angle ranging from about 0° to about 45°.

In one example of this first aspect, the method further comprises identifying, from a thermal image generated by the infrared imaging system, uniform thickness regions of the large area thin film wherein a film thickness is within a predetermined uniform thickness range; identifying, from the thermal image generated by the infrared imaging system, uneven thickness regions in the large area thin film, wherein the film thickness is not within the predetermined uniform thickness range; or combinations thereof.

In another example of this first aspect, the method further comprises selecting an IR source width of the infrared radiation source based on the predetermined angle and an object width of the large area thin film.

In still another example of this first aspect, the large area thin film has an area ranging from about 6.5 square centimeters to about 8 square meters; and the large area thin film is a monolayer or has a film thickness up to about 10 µm.

In yet another example of this first aspect, the large area thin film is deposited on a substrate that is transparent to visible light; the large area thin film is also transparent to visible light; and the large area thin film is distinguishable from the substrate in a thermal image generated by the infrared imaging system.

In yet another example of this first aspect, the large area thin film is selected from the group consisting of poly(3,4-ethylenedioxythiophene) polystyrene sulfonate, polypyrrole, polyaniline, and combinations thereof.

It is to be understood that any features of this first aspect of the method may be combined together in any desirable manner and/or configuration.

In a second aspect, a method comprises maintaining a sample having a large area thin film at a predetermined position having a predetermined angle of about 0° with respect to a spatially non-scanning infrared (IR) radiation source, wherein: the large area thin film reflects infrared radiation and at least a portion of the large area thin film is electrically conductive; and an IR source width of the infrared radiation source is at least two times an object width of the large area thin film; while maintaining the sample at the predetermined angle, directly illuminating the large area thin film with infrared radiation from the spatially non-scanning infrared radiation source; and through an aperture in the spatially non-scanning infrared radiation source, generating an optical image from reflected infrared radiation from the large area thin film by an infrared imaging system positioned to receive the reflected infrared radiation through the aperture.

In one example of this second aspect, a ratio of a surface area of the large area thin film to an aperture area of the aperture is greater than 1.

In another example of this second aspect, the method further comprises identifying, from a thermal image generated by the infrared imaging system, uniform thickness regions of the large area thin film, wherein a film thickness is within a predetermined uniform thickness range; identifying, from the thermal image generated by the infrared imaging system, uneven thickness regions in the large area thin film, wherein the film thickness is not within the predetermined uniform thickness range; or combinations thereof.

In still another example of this second aspect, the large area thin film has an area ranging from about 6.5 square centimeters to about 8 square meters, and the large area thin film is a monolayer or has a film thickness up to about 10 µm.

In yet another example of this second aspect, the large area thin film is deposited on a substrate that is transparent to visible light; the large area thin film is also transparent to visible light; and the large area thin film is distinguishable from the substrate in a thermal image generated by the infrared imaging system.

In yet another example of this second aspect, the large area thin film is selected from the group consisting of poly(3,4-ethylenedioxythiophene) polystyrene sulfonate, polypyrrole, polyaniline, and combinations thereof.

In still another example of this second aspect, the method further comprises repositioning the sample at an other predetermined position with respect to the spatially non-scanning infrared radiation source; generating an other optical image from reflected infrared radiation from the large area thin film by the infrared imaging system positioned to receive the reflected infrared radiation through the aperture; and combining the optical image and the other optical image to form a combined image. In an example, the combining the optical image and the other optical image includes digitally stitching the optical image and the other optical image together to generate a complete image of the large area thin film.

In yet another example of this second aspect, the method further comprises performing a background correction to correct a thermal image generated by the infrared imaging system, wherein the background correction corrects the thermal image for a zone of reduced intensity infrared radiation from the spatially non-scanning infrared radiation source due to the aperture in the spatially non-scanning infrared radiation source.

It is to be understood that any features of the second aspect of the method may be combined together in any desirable manner. Moreover, it is to be understood that any combination of features of the first aspect of the method and/or of the second aspect of the method may be used together, and/or that any features from either or both of these aspects may be combined with any of the examples disclosed herein.

In a third aspect, an infrared imaging system comprises a sample stage to hold a large area thin film, wherein the large area thin film reflects infrared radiation and includes a portion that is electrically conductive; a spatially non-scanning infrared (IR) radiation source positioned at an angle of about 0° with respect to the sample stage, the spatially non-scanning infrared radiation source having: an aperture defined therethrough; and an IR source width that is at least two times an object width of the large area thin film; and an infrared imaging system positioned to receive infrared radiation reflected from the large area thin film through the aperture.

In an example of this third aspect, the infrared imaging system further comprises a fan positioned to cool the large area thin film during operation of the infrared imaging system.

In another example of this third aspect, the spatially non-scanning infrared radiation source includes: an electric heating pad having emitting heatable surface; a heat conductive sheet in contact with the heatable surface; and a coating disposed on the heat conductive sheet, the coating having IR radiation emitting surface that faces the sample stage, the coating having an emissivity of at least 0.5. In an example, the heat conductive sheet is aluminum, copper, cast iron, brass, steel, or combinations thereof, and the coating is a silicone coating.

In another example of this third aspect, the infrared imaging system is a digital infrared camera.

It is to be understood that any features of the third aspect of the infrared imaging system and method may be combined together in any desirable manner. Moreover, it is to be understood that any combination of features of the third aspect of the infrared imaging system and/or of the second aspect of the method and/or of the first aspect of the method may be used together, and/or that any features from any one or more of these aspects may be combined with any of the examples disclosed herein.

DETAILED DESCRIPTION

Transparent conductive films are used in some electronic devices (e.g., LCDs, photovoltaics, OLEDs, touchscreens and digital fluidic devices). The transparency of the transparent conductive films may make rapid analysis of operative electrical properties of the transparent conductive film difficult to assess using existing inspection techniques. An example of an operative electrical property of transparent conductive films is electrical conductivity.

In an example, PEDOT:PSS, a conductive polymer, may be disposed as a transparent conductive thin film over large electronic devices. The conductivity of a 93 nm film of PEDOT:PSS has been measured to be as low as 0.4 siemens per centimeter (S/cm); however, the conductivity of PEDOT:PSS can be enhanced, for example, by the addition of 3% ethylene glycol. Timely inspection and quality analysis of the transparent conductive film by optical microscopy combined with an automated motorized stage is both impractical due to 1) the large area covered by the transparent conductive film and 2) visual detection difficulty due to the high transparency of the transparent conductive film. Electron microscopy (e.g., transmission electron microscopy (TEM) and scanning electron microscopy (SEM)) may offer advantages over optical microscopy in resolution of the transparent conductive film; but the practicality of electron microscopy is reduced by the time it would take to image and analyze large areas. Electron microscopy for the inspection and quality analysis of the transparent conductive film is made even less practical by the requirements for sample preparation and by material incompatibility. Still further, the equipment required for electron microscopy is too delicate to allow any in-line manufacturing capability for thin film characterization.

When electromagnetic radiation is incident upon an object, all of the electromagnetic radiation energy is absorbed, reflected, and/or transmitted by the object. The amounts of electromagnetic radiation energy absorbed, reflected, and transmitted when the electromagnetic radiation strikes an object may be expressed as a percentage of the total electromagnetic radiation energy in the incident electromagnetic waves. The following properties of a material account for the total amount of energy in the incident electromagnetic waves: absorptivity ($\alpha$); reflectivity ($\rho$); and transmissivity (t):

$$\alpha + \rho + t = 1.$$

Absorptivity ($\alpha$) accounts for the fraction of radiation energy absorbed by an object. For the purposes of the present disclosure, florescence is considered to be a process of absorption of at least a portion of radiation energy incident on the object and emission of radiation energy at different wavelengths from the absorbed radiation.

Reflectivity ($\rho$) accounts for the fraction of radiation energy reflected by the surface of the object.

Transmissivity (t) accounts for the fraction of radiation energy transmitted through the object.

The absorptivity, reflectivity, and transmissivity of an object may be dependent on the wavelength of the incident radiation energy. For example, mirrored sunglasses may reflect certain wavelengths of visible light, absorb certain wavelengths of visible light, and transmit other wavelengths of visible light.

An object is considered transparent if it can transmit some of the radiation energy impinging upon on a surface of the object all of the way through the object. If no portion of the electromagnetic radiation energy is transmitted through the substance of the object, the object is called "opaque".

Reflection is characterized as being specular reflection, diffuse reflection, or combinations thereof. In specular reflection, the angles of reflection and incidence are equal. In diffuse reflection, radiation is reflected equally in all directions. Reflection from smooth and polished surfaces may be assumed to be specular reflection, whereas reflection from rough surfaces may approximate diffuse reflection. In radiation analysis a surface is defined as smooth if the height of the surface roughness is much smaller relative to the wavelength of the incident radiation.

The light reflectance properties of some thin films may differ from the light reflectance properties of the underlying substrate. When light impinges on the thin film, the light is reflected, transmitted, or absorbed. Thus, even if only a portion of the electromagnetic energy is reflected by a sample of thin film on a non-reflective substrate, the substrate may absorb or transmit the unreflected electromagnetic energy. Thus, the image reflected by the thin film will not have an interfering reflective image from the underlying material.

Specular Reflectance imaging with visible wavelengths is used in art, archeology and also quality control. However, existing specular reflectance methods are not directly transferable to large sample imaging in the far infrared spectrum because technical obstacles have been heretofore insurmountable. The present disclosure shows how these technical obstacles are overcome herein.

Poly(3,4-ethylenedioxythiophene) polystyrene sulfonate (PEDOT:PSS) is highly reflective in the far infrared (IR) spectrum, but not in the visible spectrum. Certain clear plastics, (e.g., polycarbonate and polycyclic olefin polymers) absorb IR light with little to no reflection. A method is disclosed herein to image the specular IR reflectance of flat samples allowing for large-area sample and/or coating inspection. The intensity of the reflected IR radiation scales with the thickness and uniformity of the coating over a range relevant for thin films. Further, the uniformity of the thin film can be assessed through evaluation of scattering caused by inhomogeneity in the films. The present disclosure advantageously improves the manufacturing process for large area devices by allowing in-line quality control at manufacturing line rates.

Existing methods have not been capable of quickly characterizing large samples under certain conditions. For example, when a large sample has a coating that is IR reflective, and the underlying substrate is not IR reflective; existing methods have not been successful in quickly characterizing certain aspects of the coating. The present disclosure includes an imaging system suitable for IR reflectance analysis of thin films with repeatable large-area measurements.

It is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad. Moreover, unless explicitly stated to the contrary, examples comprising, including, or having an element or a plurality of elements having a particular property may include additional elements, whether or not the additional elements have that property.

As used herein, the term "large area thin film" refers to a thin film disposed on a surface having an area greater than about 5 square centimeters.

As used herein, the term "thin film" refers to a layer of material ranging from fractions of a nanometer to several micrometers in thickness.

As used herein, the term "infrared radiation" means electromagnetic radiation in a region of the electromagnetic radiation spectrum having wavelengths ranging from about 700 nanometers (frequency 430 THz) to 1 millimeter (frequency 300 GHz).

As used herein, the term "near infrared radiation" refers to electromagnetic radiation in a region of the electromagnetic radiation spectrum having wavelengths ranging from about 700 nanometers (frequency 430 THz) to about 1.4 µm (frequency 214 THz).

As used herein, the term "mid-wavelength infrared radiation" refers to electromagnetic radiation in a region of the electromagnetic radiation spectrum having wavelengths ranging from about 1.4 µm (frequency 214 THz) to about 15 µm (frequency 100 THz).

As used herein, the term "far infrared radiation" refers to electromagnetic radiation in a region of the electromagnetic radiation spectrum having wavelengths ranging from about 15 µm (frequency 100 THz) to about 1000 µm (frequency 300 GHz).

As used herein, the term "infrared radiation source" means an object that emits infrared radiation.

As used herein, the term "spatially non-scanning infrared radiation source" means an infrared radiation source that emits infrared radiation in a spatially invariant pattern for an observation time period.

As used herein, the term "electrically conductive" means having an electrical conductivity greater than about 1 Siemen per meter at 20 degrees Celsius (i.e., 20° C.).

As used herein, the term "directly illuminating" refers to a system having no refractive or reflective components (i.e., lenses, reflectors, collimators, and the like) between the radiation source and an illuminated object. The presence of air or a similar gas or gas mixture does not preclude direct illumination as disclosed herein.

As used herein, the term "thermal imaging" refers to a method of detecting infrared radiation emitted by and/or reflected from an object and creating an image based on the detection.

As used herein, the term "thermal image" refers to an image having areas (e.g., pixels) with variations in color that map to infrared wavelengths or intensity emitted or reflected from corresponding areas on an imaged object. A monochrome, i.e., "black and white" or grayscale image is an example of an image having spatial variation in color as contemplated herein. Some images from infrared cameras may be monochromatic when the infrared camera has an image sensor or image sensor array that does not distinguish different wavelengths of infrared radiation. Some imaging systems convert monochromatic images for display in pseudo-color, where spatial variation in hue, saturation, and brightness are used rather than changes in monochromatic intensity to map to the infrared wavelengths or intensity from the corresponding areas on the imaged object. Pseudo-color images may improve detectability of fine intensity differences that would otherwise be displayed in bright areas of a monochrome image. The terms "Pseudo-color", and "color" thermal image are used interchangeably herein, and refer to a thermal image with spatial variation in hue, saturation, and brightness. Pseudo-color", and "color" thermal images are also examples of images having variation in color as contemplated herein.

As used herein, the term "digital thermal image" refers to an array or sequence of data translatable to a thermal image. For example, a thermal image may be stored as a digital thermal image in a .jpg, .pdf, .tiff, .png or any suitable digital format.

As used herein, "reflection" is the change in direction of a wavefront at an interface between two different media so that the wavefront returns into the medium from which the wavefront originated. The law of reflection states that for specular reflection the angle at which the wave is incident on the surface (interface between two different media) equals the angle at which the wave is reflected. For example, mirrors exhibit specular reflection of visible light.

As used herein, the "angle of incidence" means the angle that an incident line or ray makes with a perpendicular to a surface at the point of incidence.

As used herein, the term "reflected infrared radiation" refers to infrared radiation from an infrared source that is reflected by an object. Reflected infrared radiation is distinct from infrared radiation that is emitted by the object itself. Infrared radiation is emitted or absorbed by molecules when the molecules change their rotational-vibrational movements.

As used herein, the term "infrared imaging device" refers to a system that forms a thermal image or a digital thermal image based on infrared radiation received by the infrared imaging device from an object. An example of an infrared imaging device may include an infrared camera. A commercially available example of an infrared camera is a FLIR A325sc, manufactured by FLIR Systems, Inc., with corporate headquarters at 27700 SW Parkway Ave., Wilsonville, Oreg. 97070.

As used herein, the term "optical axis" means a line along which there is at least partial rotational symmetry in an optical system such as a camera lens or microscope. The optical axis is an imaginary line that defines the path along which light propagates through the system. For a system composed of simple lenses and mirrors, the optical axis passes through the center of curvature of each surface, and coincides with the axis of rotational symmetry.

As used herein, the term "uniform thickness region" refers to a region of a thin film wherein a film thickness is within a predetermined uniform thickness range.

As used herein, the term "uneven thickness region" refers to a region of thin film wherein a film thickness is not within a predetermined uniform thickness range.

As used herein, the term "IR source width" refers to the linear dimension of the largest perimetral side of the IR source that emits IR radiation when the perimeter of the IR source defines a rectangle, and the largest linear dimension of the IR source that emits IR radiation when the perimeter of the IR source defines a closed curve other than a rectangle.

As used herein, the term "object width" refers to the linear dimension of the largest perimetral side of the large area thin film surface facing the IR source when the perimeter of the large area thin film surface defines a rectangle, and the largest linear dimension of the large area thin film surface facing the IR source when the perimeter of the large area thin film surface defines a closed curve other than a rectangle.

It is to be understood that the term "surface area" as used herein refers to the theoretical surface area inside the perimeters of the surface as if the surface is perfectly smooth. As such, surface roughness does not affect the calculation of the surface area as defined herein.

As used herein, the term "monolayer" means a single, closely packed layer of atoms, molecules, or cells.

As used herein, the term "transparent to visible light" refers to a property of a body, material, or substance having the ability to transmit visible light impinging upon a surface of the body, material, or substance.

As used herein, the term "bright-field microscopy" refers to microscopy in which white light is transmitted through the sample (i.e., illuminated from below and observed from above), and contrast in the sample is caused by attenuation of the transmitted light in dense areas of the sample.

As used herein, the term "aperture" means an opening defined through a body.

As used herein, the term "optical image" means a visible representation of an object. An optical image may be stored as a digital image for reproduction as a projected or printed image.

As used herein, "emissivity" means the ratio of the thermal radiation from a surface to the radiation from an ideal black surface at the same temperature as given by the StefanBoltzmann law. Emissivity is dimensionless, ranging from 0 to 1.

As used herein, "thermal radiation" refers to the emission of electromagnetic waves from all matter that has a temperature greater than absolute zero. Thermal radiation may include visible wavelengths and infrared wavelengths.

As used herein, the term "signal" is intended to mean an indicator that represents information. Signals include, for example, an electrical signal and an optical signal. The term "electrical signal" refers to an indicator of an electrical quality that represents information. The indicator can be, for example, current, voltage, tunneling, resistance, potential, voltage, conductance, or a transverse electrical effect. An "electronic current" or "electric current" refers to a flow of electric charge.

The term "substrate" refers to a rigid, solid support that is insoluble in aqueous liquid and is incapable of passing a liquid absent an aperture, port, or other like liquid conduit. Examples of suitable substrates include glass and modified or functionalized glass, plastics (including acrylics, polystyrene and copolymers of styrene and other materials, polypropylene, polyethylene, polybutylene, polyurethanes, polytetrafluoroethylene (PTFE) (such as TEFLON® from Chemours), cyclic olefins/cyclo-olefin polymers (COP) (such as ZEONOR® from Zeon), polyimides, etc.), nylon, ceramics, silica or silica-based materials, silicon and modified silicon, carbon, non-conductive metals, inorganic glasses, and optical fiber bundles.

The terms top, bottom, lower, upper, on, etc. are used herein to describe the infrared imaging system and/or the various components of the infrared imaging system. It is to be understood that these directional terms are not meant to imply a specific orientation, but are used to designate relative orientation between components. The use of directional terms should not be interpreted to limit the examples disclosed herein to any specific orientation(s).

The aspects and examples set forth herein and recited in the claims can be understood in view of the above definitions.

Figure 2:
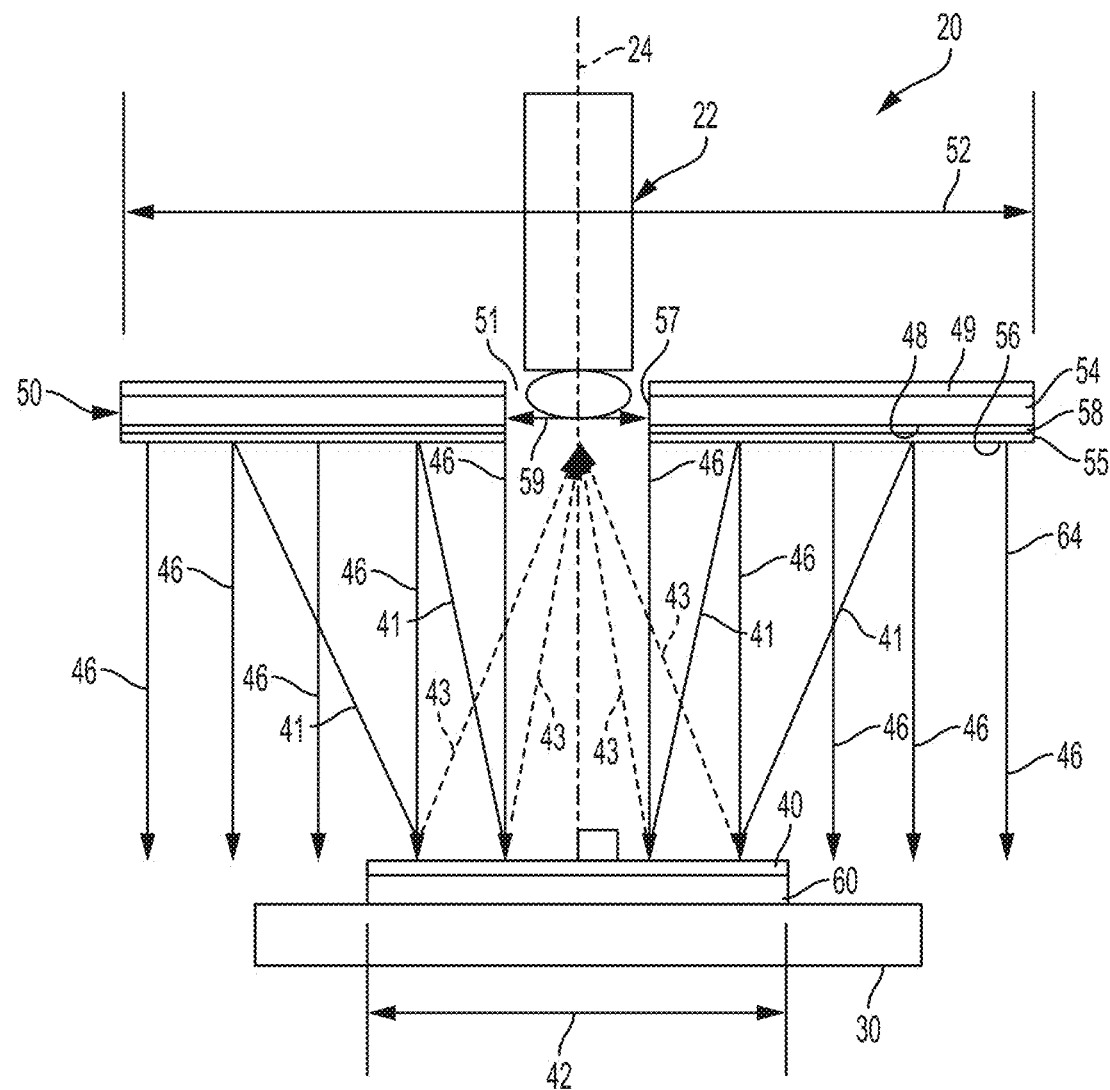
FIG. 2 is a schematic front view of portions of the example of the infrared imaging system depicted in FIG. 1 with ray traces depicted as disclosed herein.

FIG. 1 is a front perspective view depicting an example of an infrared imaging system 20 according to the present disclosure. FIG. 2 is a schematic front view of portions of the example of the infrared imaging system 20 depicted in FIG. 1 with ray traces 64 depicted as disclosed herein. A sample stage 30 is to hold a large area thin film 40. The large area thin film 40 reflects infrared radiation and includes an electrically conductive portion 44. A spatially non-scanning infrared radiation source 50 is positioned at a predetermined angle 53 of about 0° with respect to the sample stage 30.

Figure 4:
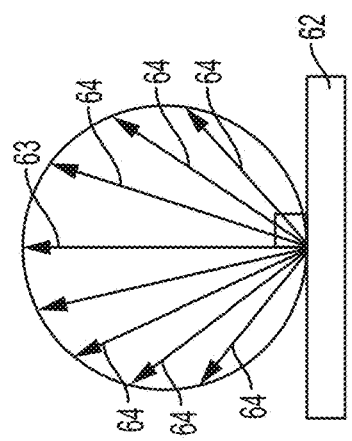
FIG. 4 is a schematic view that depicts output ray traces for an example ideal Lambertian diffuser.

As used herein, the predetermined angle 53 refers to the predominant angle of incidence of infrared radiation emitted by the spatially non-scanning infrared radiation source 50. The predominant angle of incidence is the angle of incidence of the most intense rays of IR radiation emitted from the spatially non-scanning infrared radiation source 50. The rays of IR radiation are most intense normal to the IR radiation emitting surface 56. As shown in FIG. 4, an ideal Lambertian diffuser produces an output intensity distribution that follows Lambert's cosine law. The radiant intensity, indicated by the length of the ray traces 64 shown in FIG. 4, varies with the cosine of the direction of measurement from the normal 63. It is to be understood that FIG. 4 is a two-dimensional representation of three-dimensional distribution.

In FIG. 2, the most intense rays of IR radiation emitted by the spatially non-scanning infrared radiation source 50 are indicated by reference numeral 46. The most intense rays 46 of IR radiation emitted by the spatially non-scanning infrared radiation source 50 are normal to the IR radiation emitting surface 56. It is to be understood that the diffuse radiation emitted from the IR radiation emitting surface 56 also includes oblique rays 41 that are oblique to the IR radiation emitting surface 56. It is to be further understood that the lengths of the vectors indicating oblique rays 41 in FIG. 2 do not indicate relative intensity of the oblique rays 41 compared to the most intense rays 46 in FIG. 2. Specular reflection of the oblique rays 41 toward the infrared imaging device 22 is indicated by dashed lines and reference numeral 43.

As shown above, the most intense rays of IR radiation emitted by a diffuse IR radiation source are normal to the surface of the diffuse IR radiation source. In the example depicted in FIG. 1 and FIG. 2, the spatially non-scanning infrared radiation source 50 is planar and emits diffuse IR radiation. In the example depicted in FIG. 1 and FIG. 2, the diffuse IR radiation emitted from the spatially non-scanning infrared radiation source 50 is most intense normal to the plane in which IR radiation emitting surface 56 lies. In the example depicted in FIG. 1 and FIG. 2, the planar spatially non-scanning infrared radiation source 50 is parallel to the planar sample stage 30. Therefore, in the example depicted in FIG. 1 and FIG. 2, the predominant angle of incidence of infrared radiation emitted by the spatially non-scanning infrared radiation source 50 on the planar sample stage 30 is 0°.

As used herein, having the spatially non-scanning infrared radiation source 50 at an angle of 0° with respect to the sample stage 30 applied to the example of FIG. 1 and FIG. 2 means that if the sample stage 30 were a planar reflector, the infrared radiation from the spatially non-scanning infrared radiation source 50 would be reflected directly back at the spatially non-scanning infrared radiation source 50. Therefore, the predominant angle of incidence of IR radiation on the planar reflector example of the sample stage 30 is about 0 degrees, and the angle of reflection is also about 0 degrees. It is to be understood, however, that there is sufficient oblique radiation from the spatially non-scanning infrared radiation source 50 for specular reflection from large area thin film 40 to produce a useful image via the infrared imaging device 22.

Although it may be convenient for the sample stage 30 to be planar as shown in FIG. 1 and FIG. 2, a sample stage 30 having any suitable surface contour is contemplated herein. A planar sample stage may be convenient for maintaining a large area thin film 40 at the predetermined angle 53 with respect to the spatially non-scanning infrared radiation source 50. For example, if samples of the large area thin film 40 were disposed on flat plate substrates, the substrates may be placed on the planar sample stage 30 and held in place by gravity, clamps, adhesive, or combinations thereof. A conveyor belt may traverse the sample stage with samples of the large area thin film 40 disposed on substrates arranged on the conveyor belt. Thus each sample may be presented by the conveyor belt to the infrared imaging system 20 at the predetermined angle.

In examples of the present disclosure as depicted in FIG. 1 and FIG. 2, the spatially non-scanning infrared radiation source 50 may have an aperture 51 defined therethrough. The aperture 51 has perimeter wall 57 defined on the spatially non-scanning infrared radiation source 50 to surround the aperture 51. The "aperture area" as used herein refers to a minimum, planar two-dimensional area defined by a cross section through the perimeter wall 57 of the aperture 51. The term "minimum" is included in the definition of "aperture area" for clarity. For example, cross-sections through cylindrical walls may define an infinite number of two-dimensional areas, with the minimum being bounded by a circle, and the maximum being bounded by an ellipse. Although the perimeter wall 57 shown in FIG. 2 is cylindrical, it is to be understood that the perimeter wall 57 is not necessarily limited to being cylindrical. In an example, the perimeter wall 57 depicted in FIG. 2 defines a cylinder that may have a diameter 59 of about 1.25 inch (3.17 cm). The aperture area for such a cylinder would be $3.14*(3.17 \text{ cm})^2/4 = 7.89 \text{ cm}^2$.

In examples of the present disclosure as depicted in FIG. 2, a ratio of a surface area of the large area thin film 40 to the aperture area of the aperture 51 is greater than 1. In other words, the large area thin film 40 is larger than the aperture 51. An example of a calculation of the surface area of the large area thin film 40 is as follows: if the large area thin film 40 were disposed on a 130 mm diameter disk, the surface area of the large area thin film 40 would be $3.14*(13.0 \text{ cm})^2/4 = 132.7 \text{ cm}^2$.

In examples of the present disclosure, the large area thin film 40 may have a surface area ranging from about 6.5 square centimeters ($cm^2$) to about 8 square meters ($m^2$). In other examples, the large area thin film 40 may have a surface area ranging from about 25 $cm^2$ to about 1 $m^2$.

In examples of the present disclosure as depicted in FIG. 2, the spatially non-scanning infrared radiation source 50 may have an IR source width 52 that is at least two times an object width 42 of the large area thin film 40. The infrared imaging system 20 may have an infrared imaging device 22 positioned to receive infrared radiation reflected from the large area thin film 40 through the aperture 51. In an example, the infrared imaging device 22 may be a digital infrared camera.

In the example of the present disclosure depicted in FIG. 1, the infrared imaging system 20 further includes a fan 32 positioned to cool the large area thin film 40 with ambient room air during operation of the infrared imaging system 20.

In examples of the present disclosure, the spatially non-scanning infrared radiation source 50 may include an electric heating pad 54 having a heatable surface 48 that faces the sample stage 30. The spatially non-scanning infrared radiation source 50 may have a heat conductive sheet 58 in contact with the heatable surface 48. The heat conductive sheet 58 conducts the heat produced by the electric heating pad 54 and distributes the heat evenly over the heat conductive sheet 58, causing the heat conductive sheet 58 to have a uniform temperature over the entire heat conductive sheet 58. In an example, the heat conductive sheet 58 may be aluminum, copper, cast iron, brass, steel, or combinations thereof.

The spatially non-scanning infrared radiation source 50 may have a coating 55 disposed on the heat conductive sheet 58. The coating has an IR radiation emitting surface 56 that faces the sample stage 30. The coating 55 may have an emissivity of at least 0.5. In an example, the coating 55 may have an emissivity of at least 0.5 for at least wavelengths between 1 μm and 300 μm. In an example, the coating 55 may be a silicone coating. In an example, the silicone coating may have an emissivity greater than 0.8. It is to be understood that emissivity for the coating 55 is not necessarily constant over the thermal radiation spectrum. Examples with coating 55 having higher emissivity in the IR spectrum will improve energy efficiency of the spatially non-scanning infrared radiation source 50 compared to examples with the coating 55 having lower emissivity in the IR spectrum.

In examples of the present disclosure, the large area thin film 40 may be selected from the group consisting of poly(3,4-ethylenedioxythiophene) polystyrene sulfonate, polypyrrole, polyaniline, and combinations thereof. It is to be understood that the large area thin film 40 may be selected from chemical variations of the polymers listed in the previous sentence with side chain modifications or alternative counterions. The chemical variation may have a conductive polymer backbone of poly(3,4-ethylenedioxythiophene), polypyrrole, or polyaniline; with or without additional functional modifications. Further, the poly(3,4-ethylenedioxythiophene) may have a polystyrene sulfonate, or other mono or poly anion as a counter ion.

In examples of the present disclosure, the large area thin film 40 may be a metal. Non-limiting examples of metal large area thin films include silver and gold.

Without being held bound to any theory, it is disclosed herein that the large size (relative to the large area thin film 40) of the spatially non-scanning infrared radiation source 50 disclosed herein may improve uniformity of the images generated by the infrared imaging system 20. In an example, the surface area of the IR radiation emitting surface 56 of the spatially non-scanning infrared radiation source 50 is at least 4 times the surface area of the large area thin film 40. In a non-limiting example, if the large area thin film 40 were disposed on a 50 mm diameter disk, the surface area of the large area thin film 40 would be $3.14*(50\ mm)^2/4=1962.5\ mm^2$. Note that the object width 42 for the example is 50 mm as defined above. If the spatially non-scanning infrared radiation source 50 were also disk shaped, an IR source width 52 that is two times the object width 42 would have a diameter of 100 mm. The surface area of the IR radiation emitting surface 56 of the spatially non-scanning infrared radiation source 50 in the example of this paragraph would be 7850 mm². Note that 1962.5×4=7850; thus the surface area of the IR radiation emitting surface 56 of the spatially non-scanning infrared radiation source 50 is at least 4 times the surface area of the large area thin film 40. In the calculation of the surface area of the IR radiation emitting surface 56, no deduction need be made for the aperture 51, particularly in examples having a relatively small aperture 51 compared to the IR radiation emitting surface 56.

It is further disclosed herein that greater IR intensity emitted by the spatially non-scanning infrared radiation source 50 allows the infrared imaging system 20 to generate images with higher contrast. Fixing the geometry of the reflectance reduces sample setup variation and thereby makes variation in the images easier to attribute to actual variation in the samples. As used herein, the "geometry of the reflectance" means the path and angles of the IR radiation emitted by the spatially non-scanning infrared radiation source 50, reflected by the large area thin film 40 and received by the infrared imaging device 22.

The back side of the spatially non-scanning infrared radiation source 50 (i.e., the side of the spatially non-scanning infrared radiation source 50 facing opposite the IR radiation emitting surface 56) may have a thermal insulator disposed over the electric heating pad 54 for energy efficiency and to reduce heating of adjacent components in the infrared imaging system 20.

Figure 3:
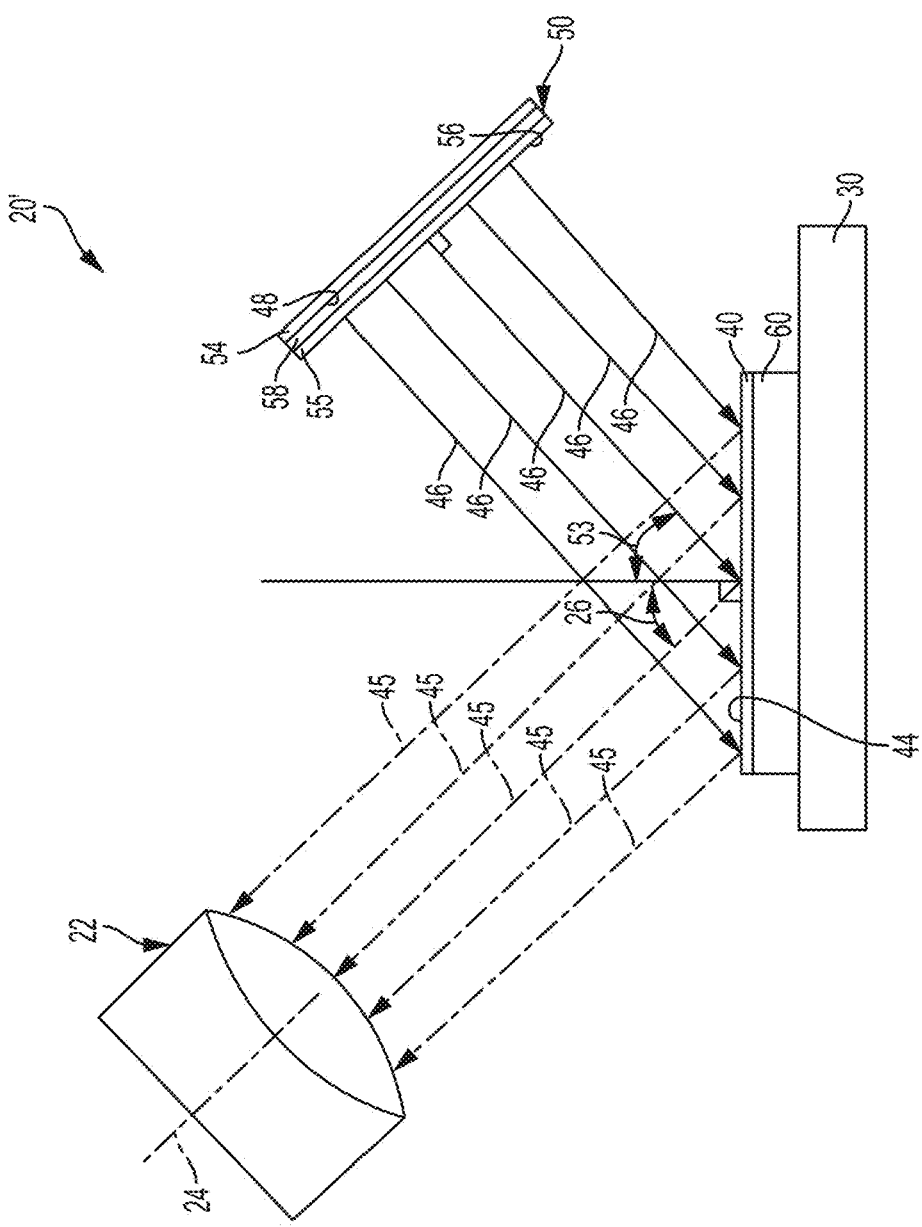
FIG. 3 is a schematic front view of another example of the infrared imaging system as disclosed herein.

FIG. 3 is a schematic side view of an example of an infrared imaging system 20'. The sample stage 30 is to hold the large area thin film 40. The large area thin film 40 is disposed on a substrate 60. A spatially non-scanning infrared radiation source 50 is positioned at a predetermined angle 53 ranging from about 0° to about 45°. In FIG. 3, spatially non-scanning infrared radiation source 50 is depicted at a predetermined angle 53 of about 45°. As used herein, the predetermined angle 53 refers to the predominant angle of incidence of infrared radiation emitted by the spatially non-scanning infrared radiation source 50. In FIG. 3, the most intense rays of IR radiation emitted by the spatially non-scanning infrared radiation source 50 are indicated by reference numeral 46. As stated above, in examples where the spatially non-scanning infrared radiation source 50 emits diffuse IR radiation, the rays of IR radiation are most intense normal to the IR radiation emitting surface 56. It is to be understood that the diffuse IR radiation emitted by the spatially non-scanning infrared radiation source 50 also includes oblique radiation in addition to the radiation emitted normal to the IR radiation emitting surface 56. It is to be further understood that the lengths of the vectors indicating the most intense rays 46 in FIG. 3 do not indicate relative intensity of the most intense rays 46 in FIG. 3. Specular reflection of the most intense rays 46 toward the infrared imaging device 22 is indicated by dashed lines and reference numeral 45. It is to be further understood that the lengths of the vectors indicating the specular reflection 45 of the most intense rays 46 in FIG. 3 do not indicate relative intensity of the specular reflections 45 of the most intense rays 46 in FIG. 3.

In an example, the angle between a normal to a planar IR radiation emitting surface 56 and a normal to a planar large area thin film 40 is the predetermined angle 53. It is to be understood that the purpose of identifying the predetermined angle 53 is to identify where the specular reflection of the IR radiation with the greatest intensity from the spatially non-scanning infrared radiation source 50 will be directed. The example depicted in FIG. 3 also includes an infrared imaging device 22 having an optical axis 24 positioned at a fixed angle 26 with respect to the large area thin film 40. The fixed angle 26 is selected from an angle ranging from about 0° to about 45°. In the example, the fixed angle 26 may be the predominant angle of reflection of the infrared radiation emitted by the spatially non-scanning infrared radiation source 50 and reflected by the large area thin film 40. Thus, when the fixed angle 26 is equal to the predominant angle of reflection, the infrared imaging device 22 will be positioned to receive the highest intensity reflected infrared radiation. It is to be understood, however, that since the spatially non-scanning infrared radiation source 50 may emit diffuse infrared radiation, even the specular reflection may have the appearance of being diffuse in some ways. Irregularity in the large area thin film 40 will cause variation in the intensity of the IR radiation reflected by the large area thin film 40 that can be recorded by the infrared imaging device 22.

Figure 15A:
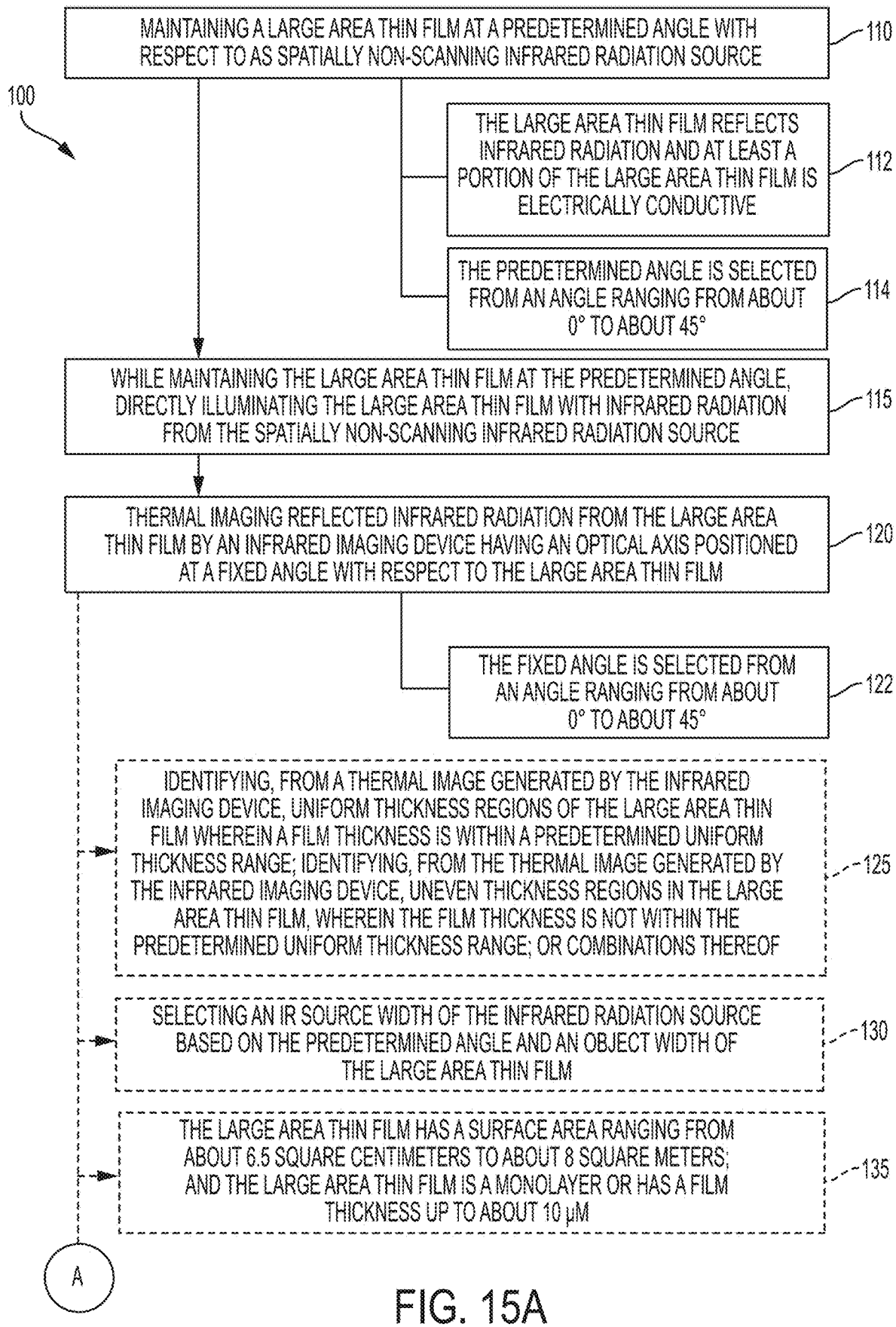
FIG. 15A is a flow diagram illustrating examples of the method disclosed herein.

FIG. 15A is a flow diagram 100 illustrating examples of the method disclosed herein. At box 110 is "maintaining a large area thin film at a predetermined angle with respect to a spatially non-scanning infrared radiation source". At box 112 is "the large area thin film reflects infrared radiation and at least a portion of the large area thin film is electrically conductive". At box 114 is "the predetermined angle is selected from an angle ranging from about 0° to about 45°".

At box 115 is "while maintaining the large area thin film at the predetermined angle, directly illuminating the large area thin film with infrared radiation from the spatially non-scanning infrared radiation source". At box 120 is "thermal imaging reflected infrared radiation from the large area thin film by an infrared imaging device having an optical axis positioned at a fixed angle with respect to the large area thin film". At box 122 is "the fixed angle is selected from an angle ranging from about 0° to about 45°".

At box 125 is "identifying, from a thermal image generated by the infrared imaging device, uniform thickness regions of the large area thin film wherein a film thickness is within a predetermined uniform thickness range; identifying, from the thermal image generated by the infrared imaging device, uneven thickness regions in the large area thin film, wherein the film thickness is not within the predetermined uniform thickness range; or combinations thereof".

At box 130 is "selecting an IR source width of the infrared radiation source based on the predetermined angle and an object width of the large area thin film". At box 135 is "the large area thin film has a surface area ranging from about 6.5 square centimeters to about 8 square meters; and the large area thin film is a monolayer or has a film thickness up to about 10 μm".

Connector A indicates that flow diagram 100 continues at FIG. 15B. At box 140 is "the large area thin film is deposited on a substrate that is transparent to visible light; the large area thin film is also transparent to visible light; and the large area thin film is distinguishable from the substrate in a thermal image generated by the infrared imaging device". At box 145 is "the large area thin film is selected from the group consisting of poly(3,4-ethylenedioxythiophene) polystyrene sulfonate, polypyrrole, polyaniline, and combinations thereof".

Figure 16A:
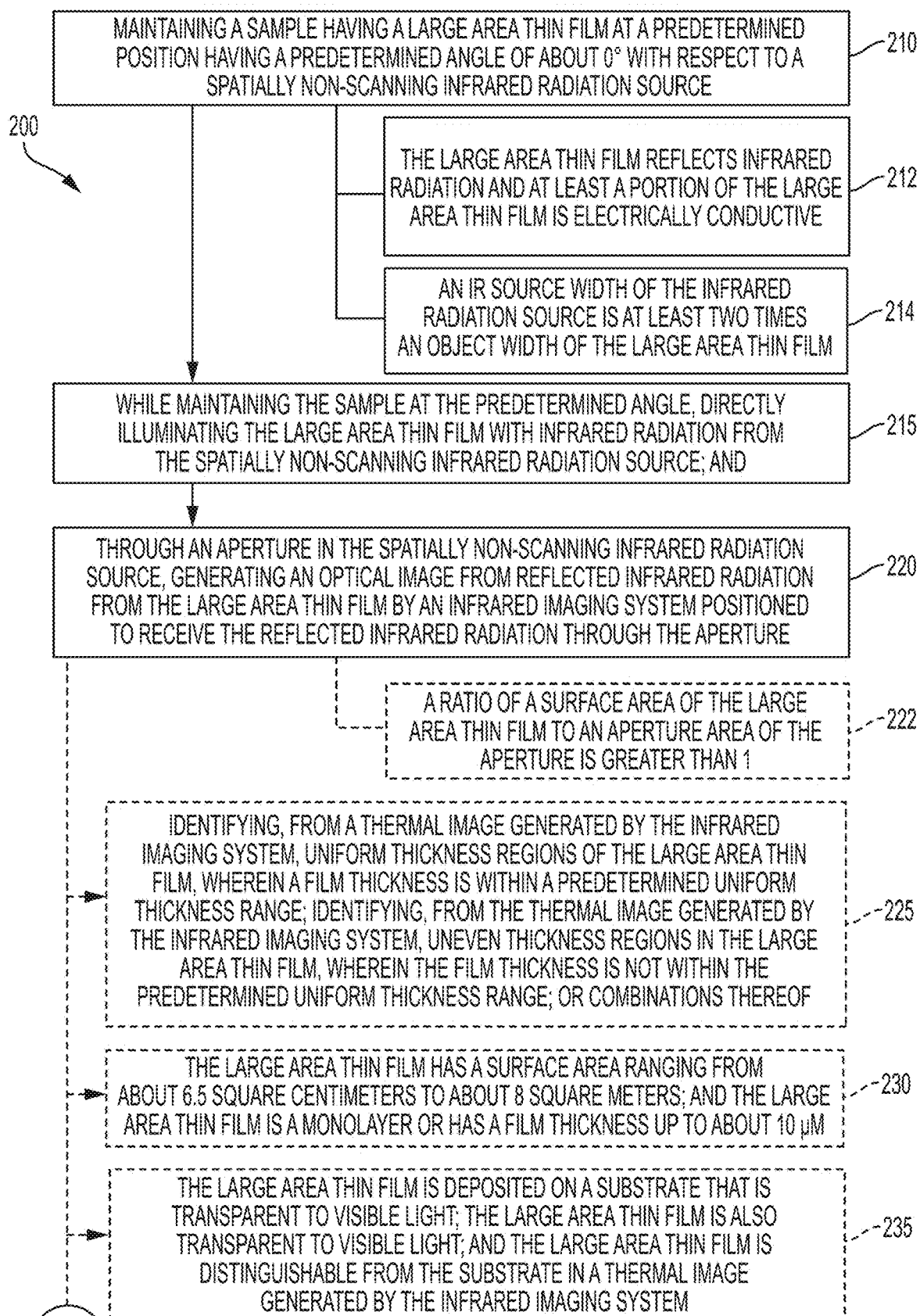
FIG. 16A is a flow diagram illustrating examples of the method disclosed herein.

FIG. 16A is a flow diagram 200 illustrating examples of the method disclosed herein. At box 210 is "maintaining a sample having a large area thin film at a predetermined position having a predetermined angle of about 0° with respect to a spatially non-scanning infrared radiation source". At box 212 is "the large area thin film reflects infrared radiation and at least a portion of the large area thin film is electrically conductive". At box 214 is "an IR source width of the infrared radiation source is at least two times an object width of the large area thin film". At box 215 is "while maintaining the sample at the predetermined angle, directly illuminating the large area thin film with infrared radiation from the spatially non-scanning infrared radiation source; and". At box 220 is "through an aperture in the spatially non-scanning infrared radiation source, generating an optical image from reflected infrared radiation from the large area thin film by an infrared imaging system positioned to receive the reflected infrared radiation through the aperture". At box 222 is "a ratio of a surface area of the large area thin film to an aperture area of the aperture is greater than 1."

At box 225 is "identifying, from a thermal image generated by the infrared imaging system, uniform thickness regions of the large area thin film, wherein a film thickness is within a predetermined uniform thickness range; identifying, from the thermal image generated by the infrared imaging system, uneven thickness regions in the large area thin film, wherein the film thickness is not within the predetermined uniform thickness range; or combinations thereof". At box 230 is "the large area thin film has a surface area ranging from about 6.5 square centimeters to about 8 square meters; and the large area thin film is a monolayer or has a film thickness up to about 10 μm".

At box 235 is "the large area thin film is deposited on a substrate that is transparent to visible light; the large area thin film is also transparent to visible light; and the large area thin film is distinguishable from the substrate in a thermal image generated by the infrared imaging system".

Connector B indicates that flow diagram 200 continues at FIG. 16B. At box 240 is "the large area thin film is selected from the group consisting of poly(3,4-ethylenedioxythiophene) polystyrene sulfonate, polypyrrole, polyaniline, and combinations thereof". At box 250 are 3 boxes: 252, 253, and 254. At box 252 is "repositioning the sample at an other predetermined position with respect to the spatially non-scanning infrared radiation source;". At box 253 is "generating an other optical image from reflected infrared radiation from the large area thin film by the infrared imaging system positioned to receive the reflected infrared radiation through the aperture; and". At box 254 is "combining the optical image and the other optical image to form a combined image".

At box 260 is "the combining the optical image and the other optical image includes digitally stitching the optical image and the other optical image together to generate a complete image of the large area thin film". At box 270 is "performing a background correction to correct a thermal image generated by the infrared imaging system, wherein the background correction corrects the thermal image for a zone of reduced intensity infrared radiation from the spatially non-scanning infrared radiation source due to the aperture in the spatially non-scanning infrared radiation source".

To further illustrate the present disclosure, examples are given herein. It is to be understood that these examples are provided for illustrative purposes and are not to be construed as limiting the scope of the present disclosure.

Non-Limiting Working Example 1

An infrared imaging system in accordance with the example shown in FIG. 3 was prepared. The substrate 60 was held at a 45° angle to both the spatially non-scanning infrared radiation source 50 and the infrared imaging device 22. In the example, the spatially non-scanning infrared radiation source 50 had an electric heating pad 54 with a heatable surface 48. In working example 1, a layer of sand was used in place of the heat conductive sheet 58 and the coating 55 depicted in FIG. 3. The layer of sand was about 0.5 cm thick. The sand was clean sand #4, available from MilliporeSigma, Temecula, Calif. 92590. The infrared imaging device 22 was a FLIR A325sc infrared camera. Tests on the example revealed that small variations in the angle of the substrate 60 with respect to either the spatially non-scanning infrared radiation source 50 or the infrared imaging device 22 had a large impact on the generated image intensity and uniformity. Despite this, the conclusions from images generated by the tested example of the infrared imaging system 20' agreed very well with the conclusions images from higher resolution optical microscopy. Two samples were prepared having thin films of PEDOT:PSS deposited on a plastic substrate and imaged using bright-field microscopy. The two samples were sized appropriately for the microscope. As seen from the scale indicated in FIG. 5A and FIG. 5C, the micrographs are enlarged views of sample areas that are about 2 mm×2 mm. The nominal thickness of the PEDOT:PSS film was about 25 nm on the "thinner" sample shown in FIG. 5A, and about 150 nm on the "thicker" sample shown in FIG. 5C. The bright-field micrograph shown in FIG. 5A has domains that appear relatively dark. The dark domains are an indicator of inhomogeneity in the thinner sample shown in 5A. The bright-field micrograph shown in FIG. 5C appears to be more homogeneous than the micrograph shown in FIG. 5A.

Figure 5B:
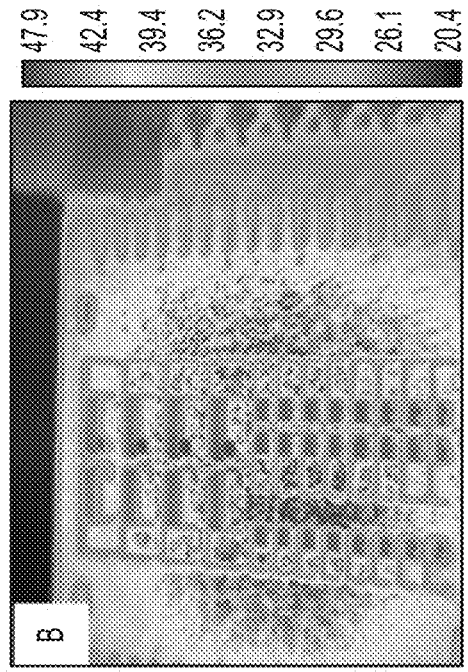
FIG. 5B is a pseudo-color thermal image of a sample with 25 nm thick PEDOT:PSS deposited on a top plate from an electrowetting system cartridge generated by Working Example 1 as disclosed herein.
Figure 5D:
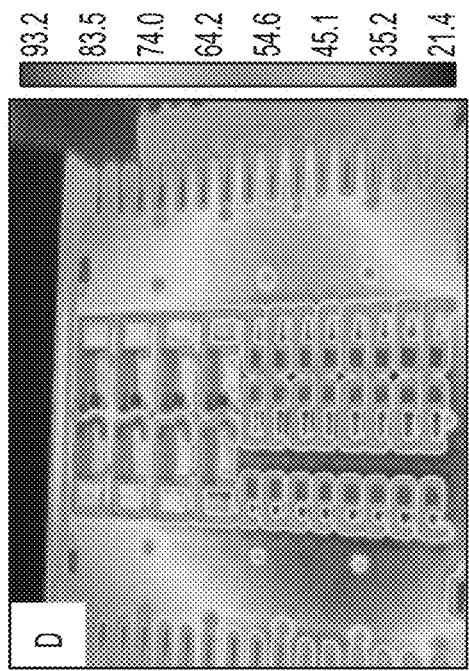
FIG. 5D is a pseudo-color thermal image of a sample with 150 nm thick PEDOT:PSS deposited on a top plate from an electrowetting system cartridge generated by Working Example 1 as disclosed herein.
Figure 5A:
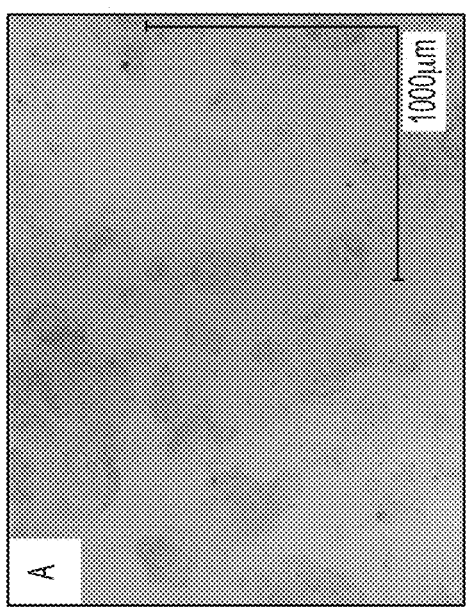
FIG. 5A is bright-field micrograph of a plastic substrate with 25 nanometer (nm) thick poly(3,4-ethylenedioxythiophene) polystyrene sulfonate (PEDOT:PSS) deposited thereon for comparative use with Working Example 1.
Figure 5C:
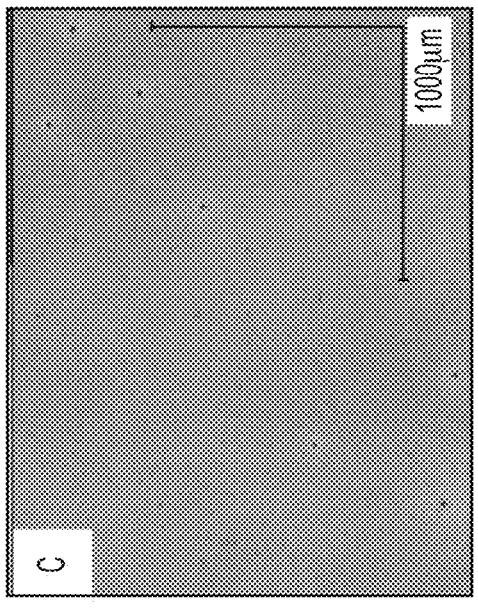
FIG. 5C is bright-field micrograph of a plastic substrate with 150 nm thick PEDOT:PSS deposited thereon for comparative use with Working Example 1.

Two other samples were prepared having thin films of PEDOT:PSS deposited on a top plate from an electrowetting system cartridge. The samples had overall dimensions of about 15 cm×10 cm. The top plate has areas that are recessed from the generally planar surface of the top plate. The nominal thickness of the PEDOT:PSS film was about 25 nm on the "thinner" sample shown in FIG. 5B, and about 150 nm on the "thicker" sample shown in FIG. 5D. FIG. 5B appears to have a grainier reflectance compared to FIG. 5D. The scale bars in FIG. 5B and FIG. 5D are in units of temperature (° C.), which correlates to the intensity of IR radiation reflected off of the samples and received by the infrared imaging device 22. Thus, the thickness of the PEDOT:PSS is detectable by bright-field microscopy for a small area sample, and by the method of the present disclosure for a large area sample.

Figure 6:
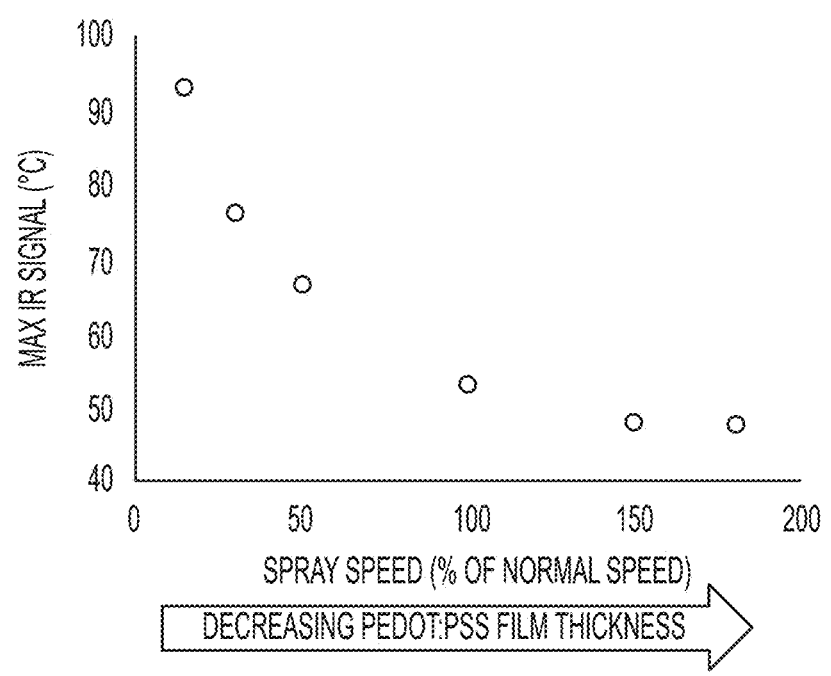
FIG. 6 is a graph showing the effect of spray speed versus the maximum IR reflectance signal for PEDOT:PSS film according to an example of the present disclosure.

FIG. 6 is a graph showing the effect of spray speed versus the maximum IR reflectance signal for PEDOT:PSS film. Decreasing the speed of the spray head deposits more PEDOT:PSS on the sample and thus results in an increase in the thickness of PEDOT:PSS thin films. The maximum IR reflectance signal, correlating to maximum temperature read by the infrared imaging device 22, decreases with decreasing film thickness. FIG. 6 shows that IR reflectivity increases with larger thickness of PEDOT:PSS.

Referring back to FIG. 5B and FIG. 5D, the overall intensity of the reflected IR light is indicated by the color on the thermographic image. Red indicates higher intensity, and blue indicates lower intensity. Since higher intensity correlates to thicker PEDOT:PSS film, the overall intensity (more red) shown in FIG. 5D is consistent with thicker PEDOT:PSS in FIG. 5D compared to FIG. 5B.

Tests with Working Example 1 showed that the FLIR A325sc with the particular lens and settings used had a relatively shallow depth of field compared to the depth that would bring the entire sample into sharp focus at the same time. Thus, the arrangement was sensitive to the angle of incidence/reflectance. Smaller angles of incidence and reflectance allowed the entire sample to be brought into focus more easily because less depth of field was required. In order to bring the entire surface of the large area thin film 40 into focus, the depth of field (DoF) must be at greater than or equal to the product of the object width 42 and the sine of the angle of incidence. Thus, the DoF required to bring the entire surface of the planar large area thin film 40 into focus becomes vanishingly small as the angle of incidence approaches zero.

Non-Limiting Working Example 2

An infrared imaging system in accordance with the example shown in FIG. 1 and FIG. 2 was prepared. Working Example 2 has a planar sample stage 30 that is depicted with a sample having a large area thin film 40 deposited thereon. The sample stage 30 is capable of adjusting the position of the stage up and down. A spatially non-scanning infrared radiation source 50 is positioned at an angle of about 0° with respect to the sample stage 30. The spatially non-scanning infrared radiation source 50 has a 1.25 inch (3.17 cm) diameter aperture 51 defined through the center of the spatially non-scanning infrared radiation source 50. The spatially non-scanning infrared radiation source 50 has an IR source width 52 at least two times an object width 42 of the large area thin film 40. The spatially non-scanning infrared radiation source 50 has an array of electric heating pads 54 regulated by an electronic controller to stabilize a heatable surface 48 at 100° C. The spatially non-scanning infrared radiation source 50 has a heat conductive sheet 58 made of aluminum in contact with the heatable surface 48 of the electric heating pads 54. The heat conductive sheet 58 is coated with a high emissivity black silicone coating 55. In Working Example 2, the coating was "Hi-Temp Silicone Coating" by Design Engineering Inc., a black spray coating available online from advanceautoparts.com. The high emissivity silicone coating 55 has an IR radiation emitting surface 56 that faces the sample stage 30. The back side of the spatially non-scanning infrared radiation source 50 (i.e., the side of the spatially non-scanning infrared radiation source 50 facing opposite the IR radiation emitting surface 56) had a thermal insulator 49 disposed over the electric heating pad 54. The infrared imaging system 20 has an infrared imaging device 22 positioned to receive infrared radiation reflected from the large area thin film 40 through the aperture 51. In Working Example 2, the infrared imaging device 22 a FLIR A325sc digital infrared camera. The volume around the infrared imaging system 20 in FIG. 1 is surrounded by transparent plastic walls. One of the transparent walls has hinges and a handle to function as a hatch for providing access to the components enclosed by the transparent walls. Working Example 2 further includes a fan 32 positioned to cool the large area thin film 40 with ambient air from the room during operation of the infrared imaging system 20.

Working Example 2 reflects the IR radiation directly back at the spatially non-scanning infrared radiation source 50. The aluminum heat conductive sheet 58 on the spatially non-scanning infrared radiation source 50 is planar, and the large area thin film 40 is also substantially planar. The plane of the spatially non-scanning infrared radiation source 50 is parallel to the plane of the large area thin film 40.

Working Example 2 is configurable to suit the sample dimensions and the field of view of the camera. The ratio of the IR source width 52 to the object width 42 of the large area thin film 40 is constant and insensitive to the distance between the spatially non-scanning infrared radiation source 50 and the large area thin film 40. Since the predominant angle of incidence is zero, the depth of field of the FLIR A325sc digital infrared camera is not a factor; the entire surface of the large area thin film 40 can be brought into sharp focus as long as any part of the surface of the large area thin film 40 can be brought into focus and the entire surface fits within the field of view of the FLIR A325sc. As stated above, the sample stage 30 is capable of adjusting the position of the stage 30 up and down, thereby moving the large area thin film 40 to be within the field of view of the FLIR A325sc. The Working Example 2 avoids the use of any optical components (other than the optical components that are part of the infrared imaging device 22) such as mirrors, lenses or beam splitters for the IR radiation. Such optical components were not found to be commercially available at the time of this disclosure. If such optical components could be custom made, the cost may be prohibitive.

The aperture 51 defined through the center of the spatially non-scanning infrared radiation source 50 to accommodate the FLIR A325sc digital infrared camera causes a "blind spot" on the images as initially output by the FLIR A325sc digital infrared camera. The blind spot is an area where the intensity of the IR radiation reflected by the large area thin film 40 is diminished because no IR radiation is emitted from the aperture 51. However, background correction or stitching of multiple images at different fore-aft and lateral positions can resolve this issue if necessary.

Figure 7:
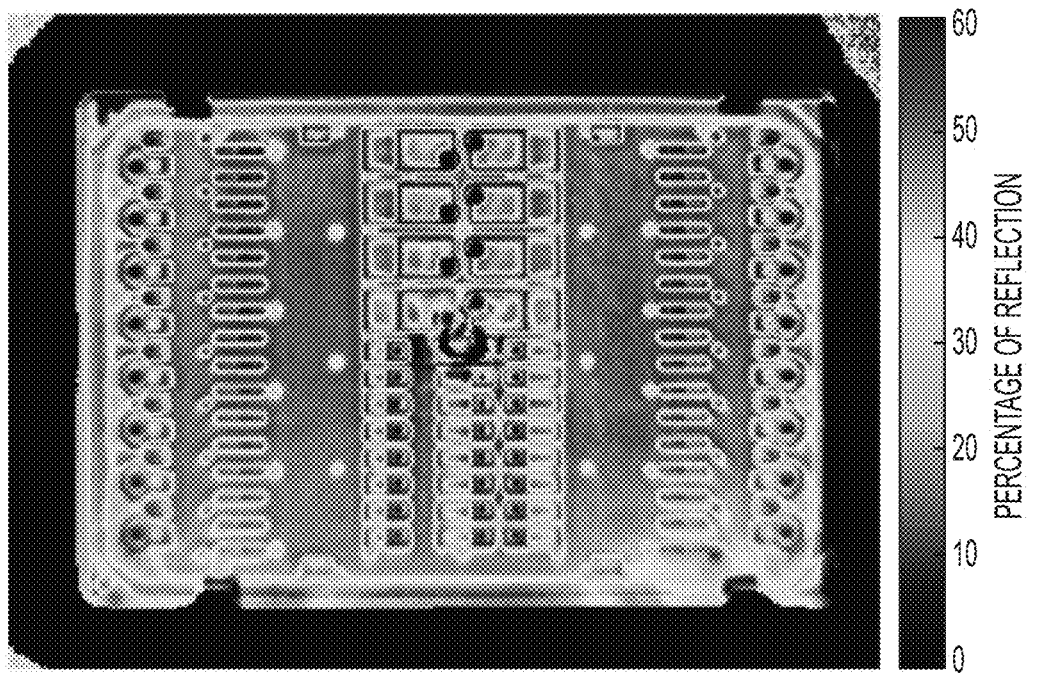
FIG. 7 is a pseudo-color image of a sample with high PEDOT:PSS density analyzed using Working Example 2 according to an example of the present disclosure.
Figure 8:
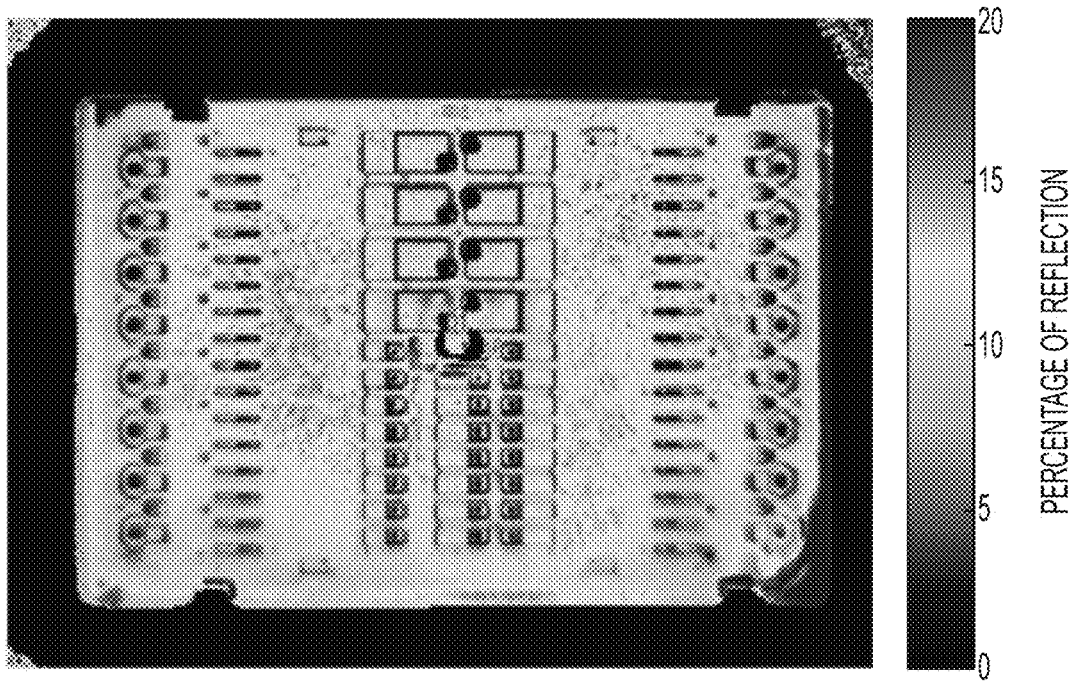
FIG. 8 is a pseudo-color image of a sample with high PEDOT:PSS density analyzed using Working Example 2 according to an example of the present disclosure.

FIG. 7 and FIG. 8 are pseudo-color images of a sample analyzed using Working Example 2. As shown in the scale bar at the right of FIG. 7 and FIG. 8, the colors map to percentage of reflection compared to a baseline "perfect" reflector. Note that FIG. 7 and FIG. 8 have different scales. The total reflectivity was determined using the following formula:

$$\text{Total Reflectivity} = (\text{Image} - \text{Background})/(\text{Reference} - \text{Background}).$$

"Image" is the intensity of the IR reflectance image of the sample. "Background" is the intensity of the IR image without a sample. "Reference" is the intensity of the IR reflectance image of a mirror (a mirror-like aluminum sheet with 99.9% reflectivity in the IR band was used). The Total Reflectivity was calculated (using a custom written MATLAB script) for samples with low PEDOT:PSS density and for samples with high PEDOT:PSS density. FIG. 7 shows that the high PEDOT:PSS density samples exhibited homogeneous reflectance with reflectivity of 55%. Homogeneity can be visually detected by a lack of graininess in the image. FIG. 8 shows that the reflectivity of the low PEDOT:PSS density samples was 15% with high inhomogeneity. The inhomogeneity can be visually detected by the amount of graininess in the image. Together the data from FIG. 7 and FIG. 8 show that Working Example 2 is capable of identifying differences in the amount of PEDOT:PSS deposited and differences in the local homogeneity of the PEDOT:PSS layer on length scales of several inches and up.

Figure 9:
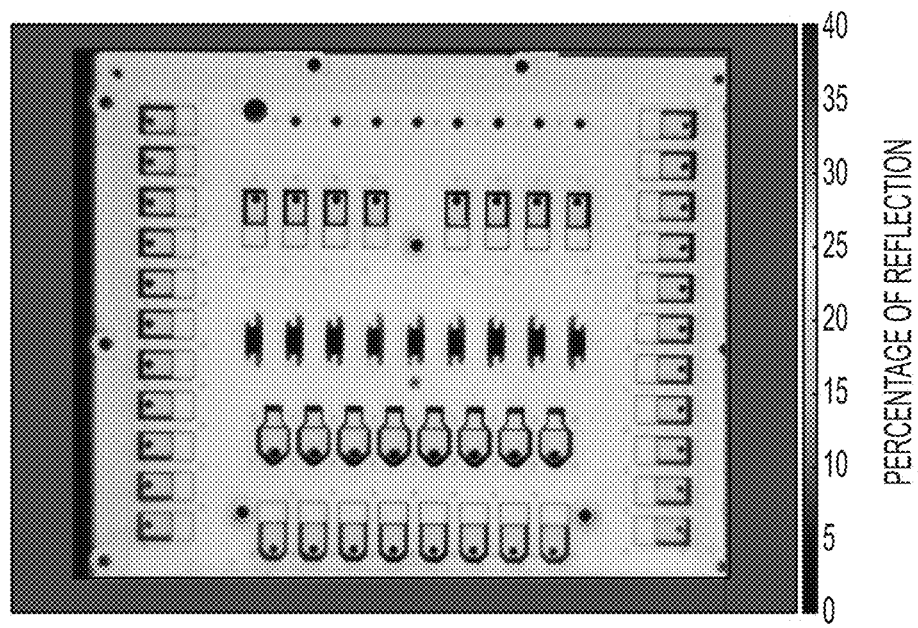
FIG. 9 is a pseudo-color image of a sample analyzed using Working Example 2 according to an example of the present disclosure.

FIG. 9 is a pseudo-color image of a sample analyzed using Working Example 2. A top plate from an electrowetting system cartridge was coated with Poly(3,4-ethylenedioxythiophene), bis-poly(ethylene glycol), lauryl terminated (PEDOT:PEG). The sample was mounted on a translation stage and imaged in two positions center and to the left. The 'left' imaged was used to perform software stitching to remove the center 'blind-spot' and construct a complete image of the sample. The color scale indicates IR light reflectivity of the coating. FIG. 9 shows that there were little, if any, defects in the coating or in the planarity or roughness of the sample plate. Notably, there were little, if any, stitching artifacts left by the software based stitching (custom written MATLAB code).

Figure 10:
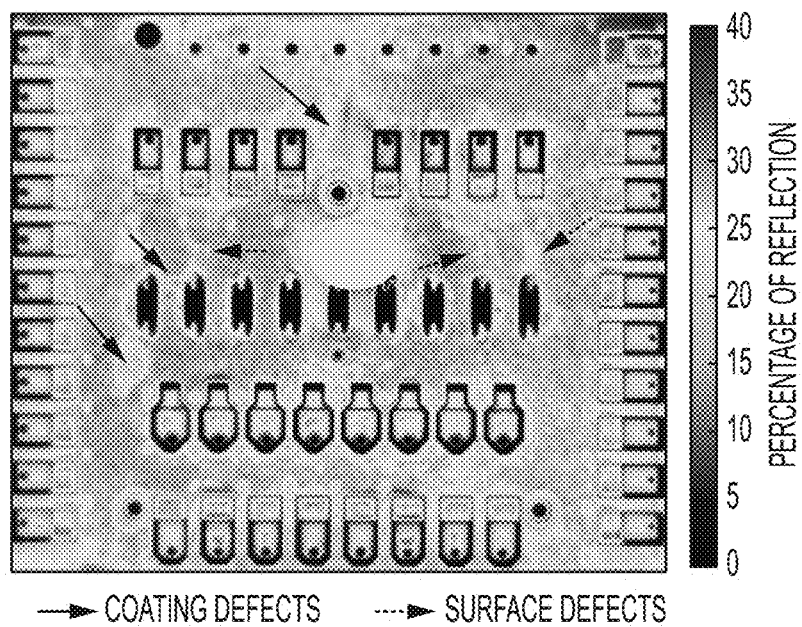
FIG. 10 is a pseudo-color image of a sample analyzed using Working Example 2 to detect coating variations and substrate surface defects according to an example of the present disclosure.

FIG. 10 is a pseudo-color image of a sample analyzed using Working Example 2 to detect coating variations and substrate surface defects. The black arrows in FIG. 10 indicate coating variations across the sample surface. Areas with coating variations as well as areas where the sample surface is completely lacking coating are detectable. Since specular reflectance produces greater intensity in the image, small (non-planar) surface defects can cause diffuse light reflection from the sample. In FIG. 10, the blue arrows are directed at defects (roughness) of the underlying plastic layer causing IR light diffusion in the reflection captured by the image.

Figures 11, 12:
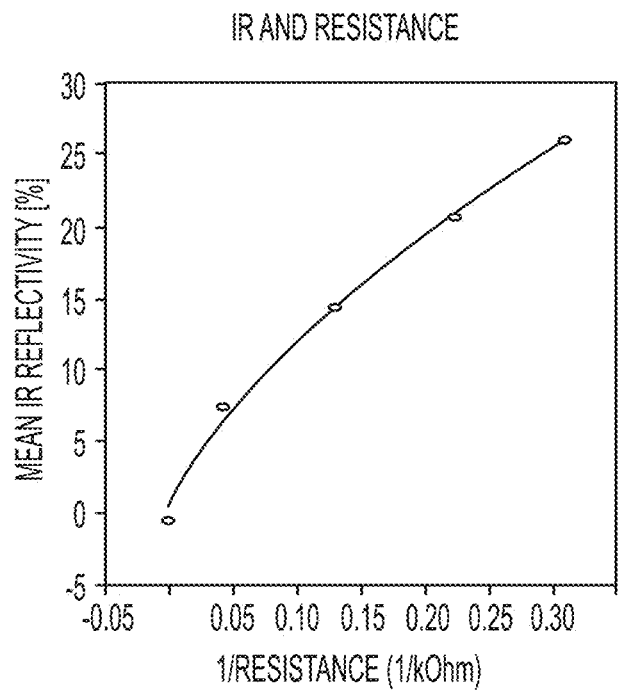
FIG. 11 is a graph of Infrared Reflectivity versus inverse of resistance (conductance) as determined using Working Example 2 according to an example of the present disclosure.
FIG. 12 is a combination table and horizontal bar chart depicting relative contributors to variation in a variability gauge study using Working Example 2 according to an example of the present disclosure.

FIG. 11 is a graph of infrared reflectivity versus inverse of resistance (conductance) as determined using Working Example 2. Sample plates were coated with different amount of PEDOT:PSS. Electrical sheet resistance of the coating was measured by an eddy current sheet resistance meter. The smooth curve in FIG. 11 shows a clear correlation between IR reflectivity and inverse resistance. The IR signal is thus correlative to the electrical resistance and can be used as an indicator in production quality control.

FIG. 12 is a combination table and horizontal bar chart depicting relative contributors to variation in a variability gauge study using Working Example 2. To demonstrate the applicability of the tool for inline quality control, a variability gauge study with multiple operators was performed. Variations in the coating amount were the largest contributor to the total variation (68.3%). The amount of time that the sample was in the enclosure before taking a measurement was the next largest contributor to the total variation (17.9%). The Regions of Interest (ROIs) are defined by rectangles across the sample plate's functional areas. The variability gauge study summarized in FIG. 12 suggests that by further improving the thermal equilibrium rate or by using an automated sample loading mechanism, the system and method of the present disclosure can be used for inline quality control for certain large area digital fluidics devices.

Figure 13:
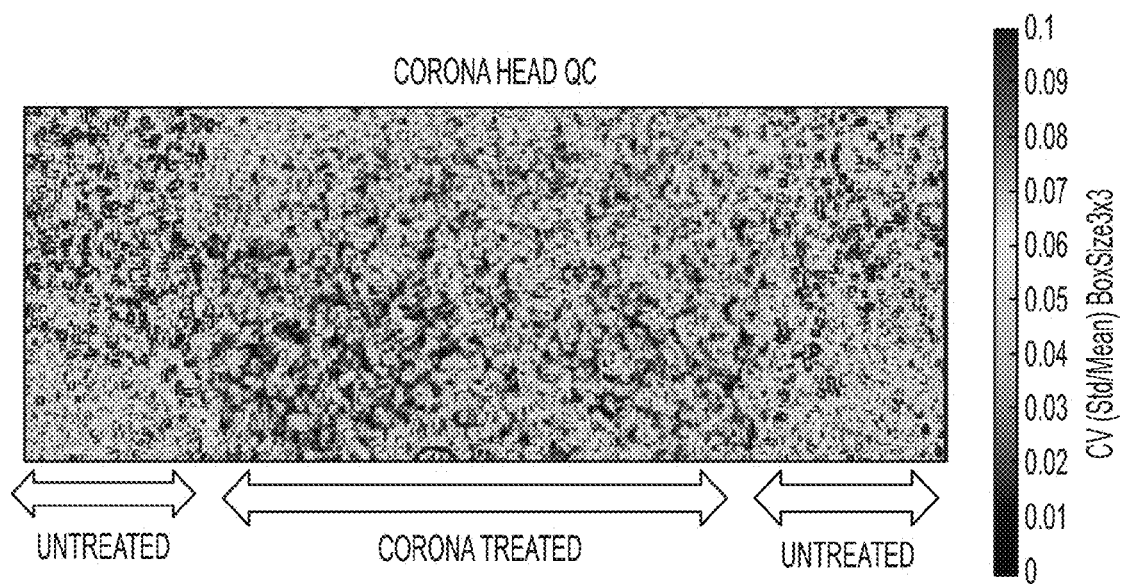
FIG. 13 is a pseudo-color image of a sample analyzed using Working Example 2 according to an example of the present disclosure to detect coating variations and substrate surface defects.

FIG. 13 is a pseudo-color image of a sample analyzed using Working Example 2 to detect coating variations and substrate surface defects. Corona surface treatment improves bonding of adhesives on plastic by creating a high frequency discharge and thus increasing the surface energy so that coating films can better spread and adhere. With corona discharge treatment, the conductive film droplets become more planar (lower contact angle) resulting in lower IR reflectance diffusion. FIG. 13 depicts the CV (Coefficient of Variation, the standard deviation divided by mean) for 3×3 pixel boxes. In other words, FIG. 13 shows how much variation there is between the IR reflectivity of a sample pixel and the pixels surrounding the sample pixel. The Corona treated areas are mainly blue in FIG. 13; the untreated areas are more reddish in FIG. 13. Thus, the corona treated areas have significantly lower CVs, and therefore, significantly less IR reflectance diffusion, indicating a smoother surface.

Figure 14:
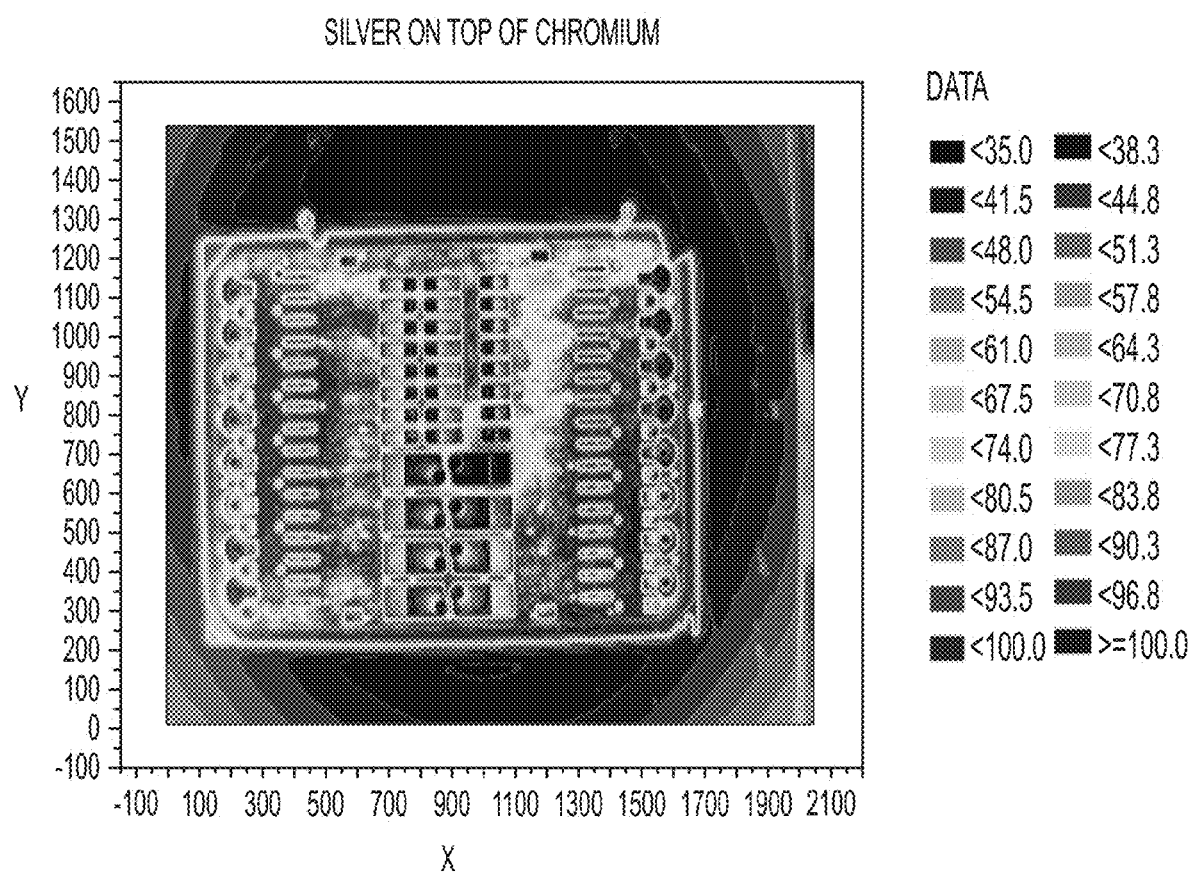
FIG. 14 is a pseudo-color image of a sample with a layer of silver on a layer of chrome on a top plate from an electrowetting system cartridge as imaged using Working Example 2 according to an example of the present disclosure.

FIG. 14 is a pseudo-color image of a sample with a thin film of silver on a layer of chrome on a top plate from an electrowetting system cartridge. The scale of the X and Y axis shown in FIG. 14 is in pixels of the infrared image. The image in FIG. 14 was generated by Working Example 2. FIG. 14 shows that the method and system of the present disclosure can be extended to conductive materials since conductive materials are generally reflective in the mid-IR spectrum. As shown in FIG. 9, the method and system of the present disclosure produced excellent results with PEDOT:PEG which is reflective (but lower total reflectance than PEDOT:PSS).

ADDITIONAL NOTES

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 6.5 square centimeters to about 8 square meters should be interpreted to include not only the explicitly recited limits of from about 6.5 square centimeters (cm$^2$) to about 8 square meters (m$^2$), but also to include individual values, such as about 100 cm$^2$, about 125 cm$^2$, about 1.5 m$^2$, about 4.1 m$^2$, etc., and sub-ranges, such as from about 25 cm$^2$ to about 1 m$^2$, from about 100 cm$^2$ to about 500 cm$^2$, etc. Furthermore, when "about" and/or "substantially" are/is utilized to describe a value, this is meant to encompass minor variations (up to +/−10%) from the stated value.

While several examples have been described in detail, it is to be understood that the disclosed examples may be modified. Therefore, the foregoing description is to be considered non-limiting.

The invention claimed is:

1. A method, comprising:
    maintaining a large area thin film at a predetermined angle with respect to a spatially non-scanning infrared (IR) radiation source, the spatially non-scanning infrared radiation source comprising a heat conductive sheet and a coating disposed on the heat conductive sheet, the coating having an IR radiation emitting surface, wherein:
        the large area thin film reflects infrared radiation and at least a portion of the large area thin film is electrically conductive; and
        the predetermined angle is selected from an angle ranging from about 0° to about 45°;
    while maintaining the large area thin film at the predetermined angle, directly illuminating the large area thin film with infrared radiation from the spatially non-scanning infrared radiation source; and
    thermal imaging reflected infrared radiation from the large area thin film by an infrared imaging device having an optical axis positioned at a fixed angle with respect to the large area thin film, wherein the fixed angle is selected from an angle ranging from about 0° to about 45°.

2. The method as defined in claim 1, further comprising:
    identifying, from a thermal image generated by the infrared imaging device, uniform thickness regions of the large area thin film, wherein a film thickness is within a predetermined uniform thickness range;
    identifying, from the thermal image generated by the infrared imaging device, uneven thickness regions in the large area thin film, wherein the film thickness is not within the predetermined uniform thickness range; or combinations thereof.

3. The method as defined in claim 1, further comprising selecting an IR source width of the infrared radiation source based on the predetermined angle and an object width of the large area thin film.

4. The method as defined in claim 1, wherein:
    the large area thin film has a surface area ranging from about 6.5 square centimeters to about 8 square meters; and
    the large area thin film is a monolayer or has a film thickness up to about 10 μm.

5. The method as defined in claim 1, wherein:
    the large area thin film is deposited on a substrate that is transparent to visible light;
    the large area thin film is also transparent to visible light; and
    the large area thin film is distinguishable from the substrate in a thermal image generated by the infrared imaging device.

6. The method as defined in claim 1, wherein the large area thin film is selected from the group consisting of poly(3,4-ethylenedioxythiophene) polystyrene sulfonate, polypyrrole, polyaniline, and combinations thereof.

7. A method, comprising:
    maintaining a sample having a large area thin film at a predetermined position having a predetermined angle of about 0° with respect to a spatially non-scanning infrared (IR) radiation source, the spatially non-scanning infrared radiation source comprising a heat conductive sheet and a coating disposed on the heat conductive sheet and having an IR radiation emitting surface, wherein:
        the large area thin film reflects infrared radiation and at least a portion of the large area thin film is electrically conductive; and
        an IR source width of the infrared radiation source is at least two times an object width of the large area thin film;
    while maintaining the sample at the predetermined angle, directly illuminating the large area thin film with infrared radiation from the spatially non-scanning infrared radiation source; and
    through an aperture in the spatially non-scanning infrared radiation source, generating an optical image from reflected infrared radiation from the large area thin film by an infrared imaging system positioned to receive the reflected infrared radiation through the aperture.

8. The method as defined in claim 7, wherein a ratio of a surface area of the large area thin film to an aperture area of the aperture is greater than 1.

9. The method as defined in claim 7, further comprising:
    identifying, from a thermal image generated by the infrared imaging system, uniform thickness regions of the large area thin film, wherein a film thickness is within a predetermined uniform thickness range;
    identifying, from the thermal image generated by the infrared imaging system, uneven thickness regions in the large area thin film, wherein the film thickness is not within the predetermined uniform thickness range; or combinations thereof.

10. The method as defined in claim 7, wherein:
    the large area thin film has a surface area ranging from about 6.5 square centimeters to about 8 square meters; and
    the large area thin film is a monolayer or has a film thickness up to about 10 μm.

11. The method as defined in claim 7, wherein:
the large area thin film is deposited on a substrate that is transparent to visible light;
the large area thin film is also transparent to visible light; and
the large area thin film is distinguishable from the substrate in a thermal image generated by the infrared imaging system.

12. The method as defined in claim 7, wherein the large area thin film is selected from the group consisting of poly(3,4-ethylenedioxythiophene) polystyrene sulfonate, polypyrrole, polyaniline, and combinations thereof.

13. The method as defined in claim 7, further comprising:
repositioning the sample at an other predetermined position with respect to the spatially non-scanning infrared radiation source;
generating an other optical image from reflected infrared radiation from the large area thin film by the infrared imaging system positioned to receive the reflected infrared radiation through the aperture; and
combining the optical image and the other optical image to form a combined image.

14. The method as defined in claim 13, wherein the combining the optical image and the other optical image includes digitally stitching the optical image and the other optical image together to generate a complete image of the large area thin film.

15. The method as defined in claim 7, further comprising performing a background correction to correct a thermal image generated by the infrared imaging system, wherein the background correction corrects the thermal image for a zone of reduced intensity infrared radiation from the spatially non-scanning infrared radiation source due to the aperture in the spatially non-scanning infrared radiation source.

16. An infrared imaging system, comprising:
a sample stage to hold a large area thin film, wherein the large area thin film reflects infrared radiation and includes a portion that is electrically conductive;
a spatially non-scanning infrared (IR) radiation source positioned at an angle of about 0° with respect to the sample stage, the spatially non-scanning infrared radiation source having:
an aperture defined therethrough;
an IR source width that is at least two times an object width of the large area thin film;
a heat conductive sheet; and
a coating disposed on the heat conductive sheet and having an IR radiation emitting surface; and
an infrared imaging device positioned to receive infrared radiation reflected from the large area thin film through the aperture.

17. The infrared imaging system as defined in claim 16, further comprising a fan positioned to cool the large area thin film during operation of the infrared imaging system.

18. The infrared imaging system as defined in claim 16, wherein the spatially non-scanning infrared radiation source includes:
an electric heating pad having a heatable surface,
wherein the heat conductive sheet is in contact with the heatable surface, and
wherein the IR radiation emitting surface of the coating faces the sample stage, the coating having an emissivity of at least 0.5.

19. The infrared imaging system as defined in claim 16, wherein:
the heat conductive sheet is aluminum, copper, cast iron, brass, steel, or combinations thereof; and
the coating is a silicone coating.

20. The infrared imaging system as defined in claim 16, wherein the infrared imaging device is a digital infrared camera.

21. The method of claim 1, wherein the infrared imaging device has an end within or immediately adjacent to an aperture of the spatially non-scanning infrared radiation source.

22. The infrared imaging system as defined in claim 16, wherein a ratio of a surface area of the large area thin film to an area of the aperture is greater than 1.

* * * * *